(12) United States Patent
Page et al.

(10) Patent No.: US 12,162,589 B2
(45) Date of Patent: Dec. 10, 2024

(54) COUPLED LANDING GEAR AND METHODS OF USE

(71) Applicant: JetZero, Inc., Long Beach, CA (US)

(72) Inventors: Mark Allan Page, Cypress, CA (US); Jay Fletcher Kempf, Warren, VT (US); Blaine Knight Rawdon, Riverside, CA (US); Myles Leonard Baker, Long Beach, CA (US); Brent Tyler Scheneman, Redondo Beach, CA (US); Daniel Sean Stuewe, Costa Mesa, CA (US); Daniel Tran, Westminster, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/868,973

(22) Filed: Jul. 20, 2022

(65) Prior Publication Data

US 2022/0388633 A1    Dec. 8, 2022

Related U.S. Application Data

(63) Continuation-in-part of application No. 17/512,421, filed on Oct. 27, 2021, now Pat. No. 11,939,043, and a continuation-in-part of application No. 16/730,754, filed on Dec. 30, 2019, now Pat. No. 11,433,991, and a continuation-in-part of application No. 16/730,108, filed on Dec. 30, 2019, now Pat. No. 11,801,932, said application No. 17/512,421 is a continuation of application No. 16/181,687, filed on Nov. 6, 2018, (Continued)

(51) Int. Cl.
*B64C 25/00* (2006.01)
*B64C 25/14* (2006.01)
*B64C 39/10* (2006.01)

(52) U.S. Cl.
CPC ............ *B64C 25/001* (2013.01); *B64C 25/14* (2013.01); *B64C 39/10* (2013.01); *B64C 2025/008* (2013.01); *B64C 2039/105* (2013.01)

(58) Field of Classification Search
CPC ......... B64C 25/22; B64C 25/10; B64C 25/14; B64C 2025/008; B64C 2039/105; B64C 39/00
See application file for complete search history.

(56) References Cited

U.S. PATENT DOCUMENTS

| | | |
|---|---|---|
| 2,368,855 A | 2/1945 | Levy |
| 2,511,502 A | 6/1950 | Gluhareff |

(Continued)

FOREIGN PATENT DOCUMENTS

| | | | |
|---|---|---|---|
| IN | 201711027261 A | 8/2017 | |
| JP | 2010018269 A | * 1/2010 | ............. B64C 25/14 |

OTHER PUBLICATIONS

Brar, Design of a Blended Wing Body Aircraft, Dec. 31, 2014.

*Primary Examiner* — Nicholas McFall
*Assistant Examiner* — Terri L Filosi
(74) *Attorney, Agent, or Firm* — Caldwell Intellectual Property Law

(57) ABSTRACT

A coupled landing gear apparatus for an aircraft including at least a nose gear disposed forward of a neutral point of an aircraft by a first distance and at least a main gear disposed aft of the neutral point of the aircraft by a second distance. The at least a nose gear and the at least a main gear are in communication with one another.

14 Claims, 15 Drawing Sheets

Related U.S. Application Data now Pat. No. 11,186,359, which is a continuation of application No. 15/198,611, filed on Jun. 30, 2016, now Pat. No. 10,150,558.

(60) Provisional application No. 62/787,092, filed on Dec. 31, 2018, provisional application No. 62/787,101, filed on Dec. 31, 2018.

(56) References Cited

U.S. PATENT DOCUMENTS

| | | | |
|---|---|---|---|
| 2,980,368 A * | 4/1961 | Wsiewolod | B64C 25/66 |
| | | | 244/102 R |
| 4,524,929 A | 6/1985 | Gebhard | |
| 4,787,486 A * | 11/1988 | Hrusch | F16F 9/516 |
| | | | 188/289 |
| 7,143,975 B2 | 12/2006 | Udall | |
| 7,249,736 B2 * | 7/2007 | Clark | B64C 25/001 |
| | | | 244/102 R |
| 7,370,828 B2 | 5/2008 | Stephens | |
| 8,276,843 B2 | 10/2012 | Wilby | |
| 11,186,359 B2 | 11/2021 | Page | |
| 2005/0218263 A1 * | 10/2005 | Udall | B64C 25/001 |
| | | | 244/102 R |
| 2008/0087766 A1 * | 4/2008 | Leutard | F15B 20/004 |
| | | | 244/102 R |
| 2009/0272844 A1 * | 11/2009 | Anger | B64C 25/00 |
| | | | 244/100 R |
| 2009/0321560 A1 * | 12/2009 | Luce | B64C 25/14 |
| | | | 244/102 R |
| 2014/0249702 A1 * | 9/2014 | Pflug | B64C 25/52 |
| | | | 701/16 |
| 2015/0101480 A1 * | 4/2015 | Luce | F16F 9/56 |
| | | | 92/61 |
| 2018/0073377 A1 * | 3/2018 | Hall | F02K 3/06 |
| 2020/0207463 A1 | 7/2020 | Schuster et al. | |
| 2020/0207464 A1 | 7/2020 | Whitlock et al. | |

* cited by examiner

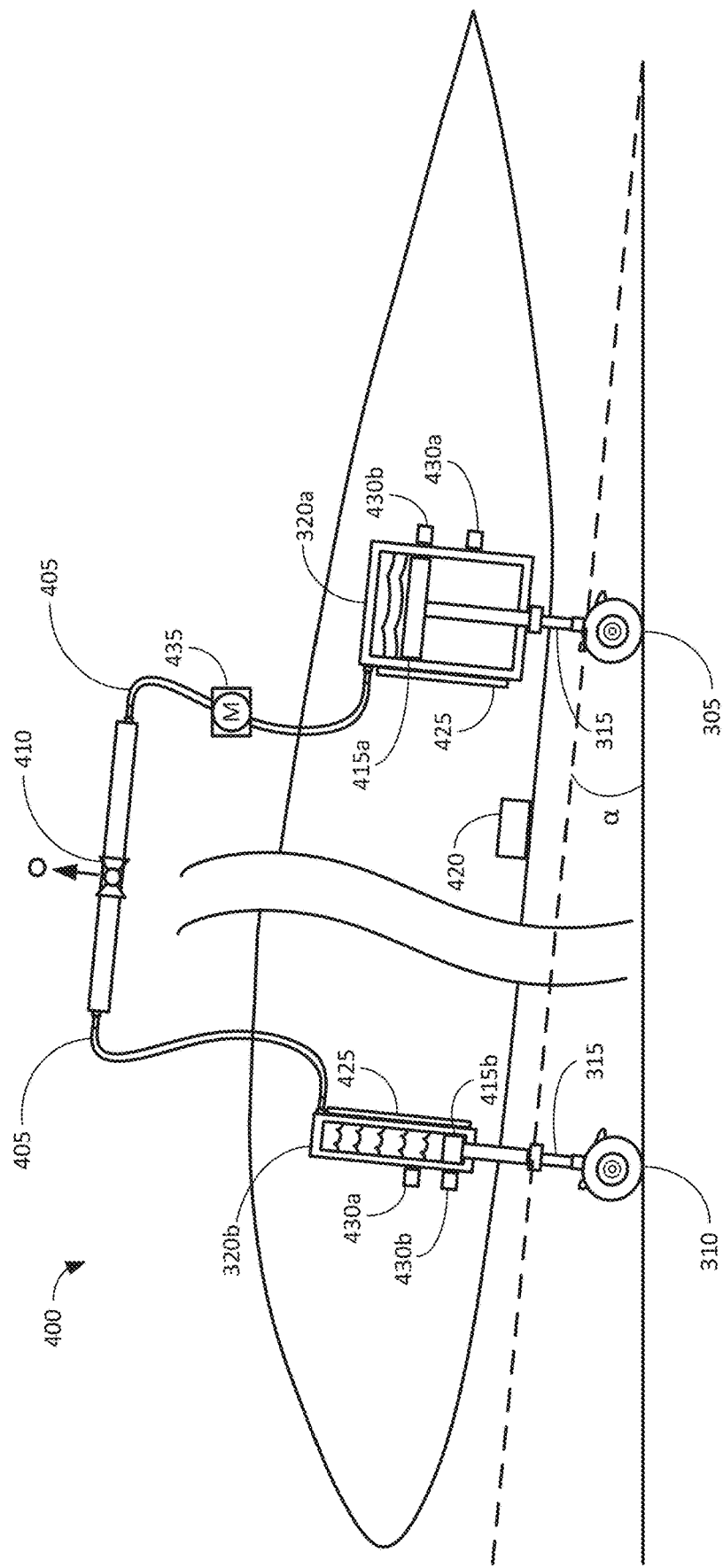

COUPLED LANDING GEAR AND METHODS OF USE

The present disclosure is a continuation-in-part of and claims priority to U.S. patent application Ser. Nos. 16/730,108, 16/730,754, and 17/512,421. U.S. patent application Ser. No. 17/512,421 filed Oct. 27, 2021, entitled "TILTED LANDING GEAR SYSTEMS AND METHODS" in turn is a continuation of and claims priority under 35 U.S.C. § 120 to U.S. patent application Ser. No. 16/181,687, filed Nov. 6, 2018, of the same title, which in turn is a continuation of, and claims priority to U.S. patent application Ser. No. 15/198,611, filed Jun. 30, 2016, of the same title, all of which are hereby incorporated by reference as if fully set forth below. U.S. patent application Ser. No. 16/730,754, filed Dec. 30, 2019, entitled "TILTING LANDING GEAR SYSTEMS AND METHODS," in turn claims priority to U.S. Provisional Application No. 62/787,101, of the same title, filed Dec. 31, 2018, both of which are hereby incorporated by reference as if fully set forth below. U.S. patent application Ser. No. 16/730,108, filed Dec. 30, 2019, entitled "SWING-ARM PIVOT PISTON LANDING GEAR SYSTEMS AND METHODS," in turn is a continuation of and claims priority to U.S. Provisional Patent Application No. 62/787,092, filed on Dec. 31, 2018, of the same title, both of which are hereby incorporated by reference as if fully set forth below.

FIELD OF THE INVENTION

The present invention generally relates to the field of aircrafts. In particular, the present invention is directed to coupled landing gear and methods of use.

BACKGROUND

Conventional aircraft consist essentially of a wing section and a fuselage. This so-called "tube and wing" configuration enables convenient packaging of passengers and cargo, but has certain drawbacks. In most cases, passengers are seated on a deck disposed approximately on the vertical centerline of the fuselage, while cargo is stowed beneath. This enables a relatively wide, flat floor for seats and separates cargo operations from passenger loading and unloading. Passengers can be loaded via one or more passenger doors, while cargo can be loaded from one or more cargo hatches on the underside or sides of the fuselage. This configuration also provides a relative constant fuselage cross section (less the nose and tail cones), enabling a substantially percentage of the available volume of the fuselage to be utilized.

While convenient from a packaging standpoint, the tube and wing configuration is not particularly efficient. This is because the fuselage provides little or no lift, yet introduces substantial drag. Thus, the wing must provide substantially all of the lift required for the aircraft to fly. This configuration requires a wing that is larger, thicker, and/or more cambered that would otherwise be required (i.e., if the fuselage provided a larger percentage of the required lift). This results in a wing with higher lift, but proportionately higher drag. Thus, the engines must provide enough thrust to overcome the drag from both the fuselage and the (now higher drag) wing.

In a blended wing configuration, on the other hand, both the fuselage and the wing provide lift. As the name implies, the blended wing blends the wing and fuselage together to provide a single, lift-producing body. In this configuration, the fuselage serves to both carry passengers and/or cargo and to provide a significant portion of the lift. As a result, the wing portion can be smaller for a given payload. Thus, blended wing aircraft tend to have significantly lower overall drag and can carry larger payloads while consuming less fuel.

Due to their unconventional shape, however, blended wing aircraft can present some challenges with regard to packaging. In other words, because the shape of the fuselage is more irregular than a conventional tube-shaped fuselage, providing storage for cargo, equipment, passengers, and other components can be challenging. In particular, as shown in FIGS. 1A and 1B, finding a suitable place to stow the retracted landing gear 105 can be challenging. In general, it is desirable to place the main, or rear, landing gear 105a fairly close to the center of gravity, CG, of the aircraft. This placement reduces the aerodynamic forces that must be generated by the flight control surfaces 120 (e.g., elevons 110 and/or flaps 115) to rotate the aircraft on take-off. In other words, if the main landing gear 105a is placed too far from the CG, the flight surfaces cannot overcome the weight of the aircraft acting on such a large lever arm, LMG, for the purposes of takeoff rotation.

As shown in FIG. 1A, therefore, from a weights and balances standpoint, it is desirable to place the main gear 105a as close to the CG as possible. In addition, the maximum width, or track, of the landing gear is limited by regulation to ensure landing gear/runway compatibility. In a blended wing design, however, this unfortunately places the landing gear in the middle of the desired passenger compartment (on a single level aircraft) or in the middle of the cargo compartment (on a multi-level aircraft). This reduces seating and/or cargo capacity and makes packaging, interior aesthetics, and utility more difficult, among other things.

As shown in FIGS. 2A and 2B, one solution is to simply move the main landing gear 105a rearward out of the passenger compartment 125. Unfortunately, this places the main landing gear 105a at a substantial distance from the CG. This, in turn, creates a large lever arm LMG, between the CG and the contact patch of the main landing gear 105a. In this configuration, the elevons 110 and/or flaps 115 are likely unable to generate enough negative lift at the rear of the wing to rotate the plane for takeoff. Thus, one problem—clearing the passenger and/or cargo compartment—has been traded for another—increasing takeoff distance or not being able to take off at all. Of the two, taking off is clearly more important in an aircraft.

What is needed, therefore, is an apparatus and method for rotating the aircraft for takeoff using something other than the aerodynamic control surfaces. After takeoff, the location of the main landing gear 105a is relevant only to the overall weights and balances of the plane (e.g., center of lift, CL vs CG). The system should be simple and robust and provide pilots with a similar tactile experience as a conventional configuration. It is to such systems and methods to which examples of the present disclosure are primarily directed.

SUMMARY OF THE DISCLOSURE

In an aspect a coupled landing gear for an aircraft includes at least a nose gear disposed forward of a neutral point of an aircraft by a first distance, at least a main gear disposed aft of the neutral point of the aircraft by a second distance, wherein the at least a nose gear and the at least a main gear are in communication with one another.

In another aspect a method of using a coupled landing gear for an aircraft includes disposing at least a nose gear forward of a neutral point of an aircraft by a first distance, disposing at least a main gear aft of the neutral point of the aircraft by a second distance, and decreasing, using the at least a nose gear and the at least a main gear, torque required to rotate the aircraft about a pitch axis, while the at least a nose gear and the at least a main gear are in a ground position.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A and 4B are side views depicting a blended-wing aircraft with a direct-hydraulic tilting landing gear system in the level, or ground position (FIG. 4A) and in the AOA position (FIG. 4B), in accordance with some examples of the present disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure allow for airplane rotation and de-rotation. Airplane "rotation" refers to an increase in airplane pitch attitude that may precede takeoff. "De-rotation" refers to a decrease in airplane pitch attitude that may follow landing touch-down. Airplane pitch attitude influences angle of attack which, in turn, influences lift. At a selected combination of angle of attack and airspeed, an airplane will lift off the runway (earth-based surface). Following touchdown, the airplane may be de-rotated to reduce lift, benefit braking, and improve steering and resistance to side force. Tricycle gear airplanes typically place between 4% and 11% of their total weight on the nose gear. The remainder is supported by the main gear. This implies that the airplane CG is a short distance ahead of the main landing gear. This arrangement provides weight on the nose gear sufficient to steer. It also inhibits inadvertent pitch rotation of the airplane about the main gear. This arrangement requires, typically, an aerodynamic moment to rotate the airplane nose-up in preparation for takeoff. Also, after touchdown in a nose-high attitude, the airplane preferably rotates to the selected deck angle under aerodynamic control. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 11. Furthermore, there is no intention to be bound by any expressed or implied theory presented in this disclosure.

Figure 3A:
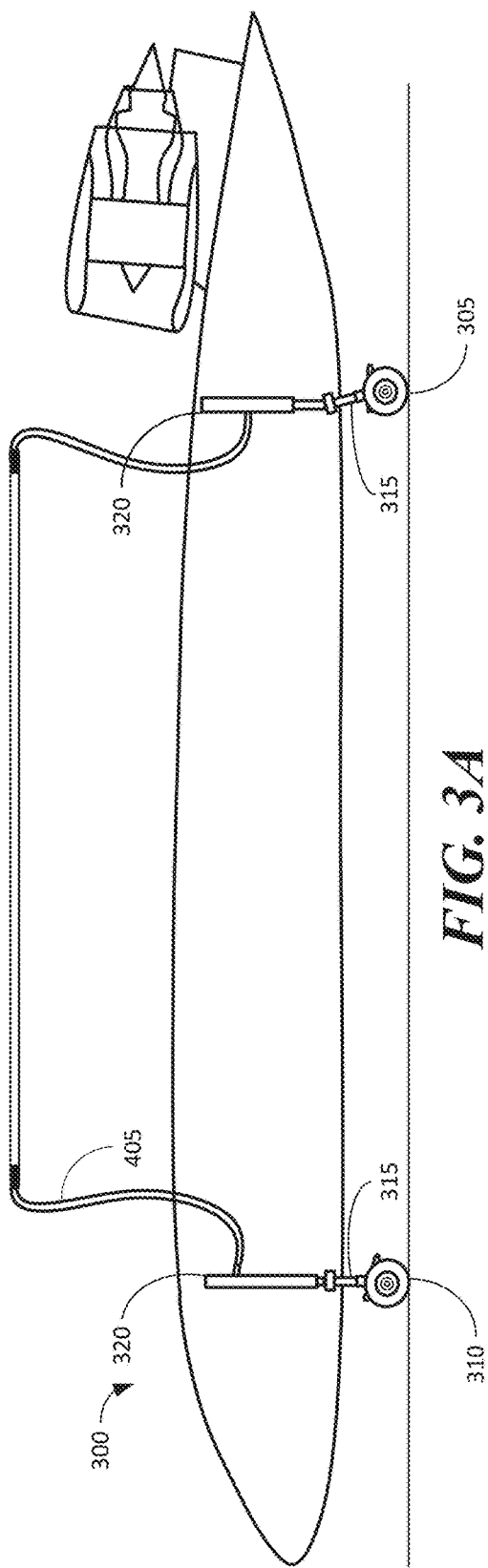
FIGS. 3A and 3B are side views depicting a blended-wing aircraft with the main landing gear in a rearward location with a tilting landing gear system in the level, or ground position (FIG. 3A) and in the angle-of-attack (AOA)—e.g., takeoff or landing—position (FIG. 3B), in accordance with some examples of the present disclosure.
Figure 3B:
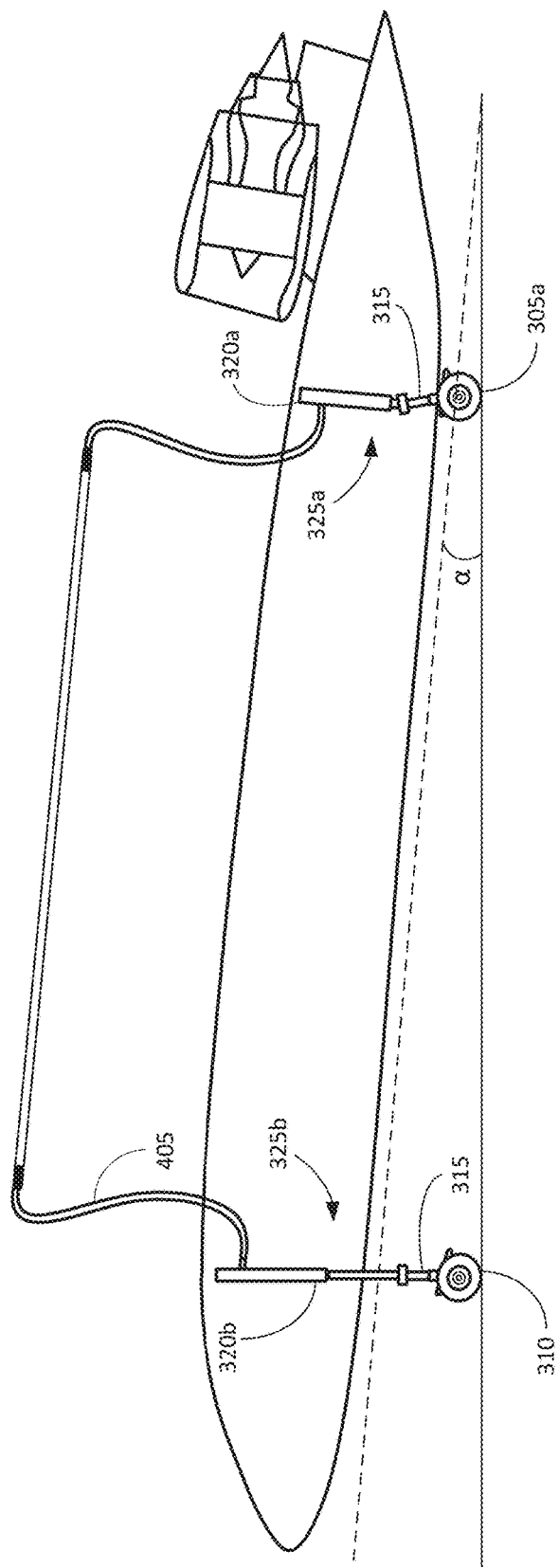

As shown in FIGS. 3A and 3B, examples of the present disclosure can comprise a system 300 comprising a main gear 305 that can squat and/or a nose gear 310 that can extend to mechanically provide the desired angle-of-attack (AOA or α) for takeoff and/or landing. In some examples, the system 300 can comprise two or more main gears 305a and one or more nose gear 310. In some instances, main gear 305 may be referred to as landing gear, rearward main gear, or the like. In some examples, the system 300 can comprise standard oleo struts 315 (e.g., air-oil pneumatic struts) mounted on one or more actuators 320. In some examples, as discussed below, the actuators 320 can be cylinders that are hydraulically linked by a hydraulic link 330 or pneumatically linked, such that when one hydraulic cylinder 320 collapses the other hydraulic cylinder 320 extends, and vice-versa. In other examples, the hydraulic cylinder 320 can be independently controlled to work in concert. In a preferred embodiment, the hydraulic cylinder 320 can comprise hydraulic cylinders that are also hydraulically linked.

As shown in FIG. 3A, therefore, in the level, or ground, configuration, the aircraft can be substantially level. In this configuration, the hydraulic cylinders 320 can be positioned such that the oleo struts 315 suspend the aircraft at a substantially level attitude with respect to the ground. This can enable passengers and cargo to be loaded onto the aircraft in the conventional manner. This can also enable the aircraft to be taxied for takeoff without unnecessarily affecting the pilot's view of the ground or adversely affecting ground handling. In other examples, the aircraft can have a slightly nose heavy configuration, for example, such that when the aircraft is on the ground, the nose hydraulic cylinder 320b is fully retracted and the main hydraulic cylinder 320a is fully extended. As discussed below, in some examples, for safety purposes, the hydraulic cylinders 320 can be locked in the level position anytime the aircraft is on the ground and below a predetermined speed unless otherwise overridden—e.g., for maintenance purposes.

As shown in FIG. 3B, however, to enable the aircraft to rotate for takeoff or landing, the main hydraulic cylinder 320a can collapse and the nose hydraulic cylinder 320b can extend to provide the desired AOA. In this configuration, as with conventional landing gear, the oleo struts 315 react to impacts and undulations on the ground, but these motions are measured in inches, quite small relative to the stroke needed for the tilting system. As the hydraulic cylinders collapse and extend, however, the overall height of the strut/cylinder assembly 325 changes.

Thus, as the main hydraulic cylinder(s) 320a (i.e., two or more main hydraulic cylinder 320a for the two or more main gears 305a) retracts, the rear strut/cylinder assembly 325a squats. Conversely, as the nose hydraulic cylinder 320b (i.e., the cylinder for the nose gear 310) extends, the nose strut/cylinder assembly 325b extends. This has the effect of lowering the rear of the aircraft and raising the front of the aircraft to simulate takeoff rotation and/or landing flare.

Notably, however, this attitude is achieved with the landing gear 305, 310 still on the ground. In addition, as discussed below, the location and size of the hydraulic cylinders 320 can be such that they are essentially in equilibrium about the $C_G$. In this manner, the system 300 can rotate the aircraft with very little force provided by the aerodynamic surfaces of the wing. This (1) overcomes the aforementioned issues related to overcoming a large $L_{MG}$ and (2) does so with the wing in a more aerodynamically efficient configuration. Because rotation requires much less negative lift and thus, deflection of the elevons 110 (or elevons in a tailless configuration) and/or flaps 115, the wing is also in a "cleaner" aerodynamic configuration (at least initially). In other words, significantly less negative lift is required at the back of the wing to generate the rotation moment, enabling the wing to provide greater positive lift for takeoff. This, in turn, can reduce takeoff speed, and therefore takeoff distance.

Upon takeoff, once the main gear 305 has cleared the tarmac, the location of the main gear 305 is no longer relevant from an aerodynamic standpoint. Once aloft, the location of the main gear 305 is relevant only from a weights and balances standpoint, which can be accounted for with fuel, cargo, and/or passenger weight, among other things. At or before liftoff, therefore, the flight control surfaces 120 can be positioned to provide the necessary aerodynamic forces to maintain the desired AOA for climb out.

Of course, while shown and described with hydraulic cylinders 320, pneumatic cylinders and other types of linear or rotary actuators could be used. The system 300 could utilize linear actuators, for example, electrically driven by the aircraft's electrical system. The system 300 could also utilize servo motors, for example, with a rack and pinion or pushrod actuation to the landing gear 305, 310. Indeed, rather than using separate hydraulic cylinders 320, as shown, the system 300 could use lengthened versions of the existing oleo struts 315 interconnected in a similar manner. This configuration might reduce weight and complexity if sufficient space is available in the airplane for the lengthy struts 315 and the volume swept by the rotation angle needed for retraction. Thus, any type of mechanism that can enable the main gear 305 to squat and/or the nose gear 310 to lift can provide the necessary AOA.

Figure 4A:
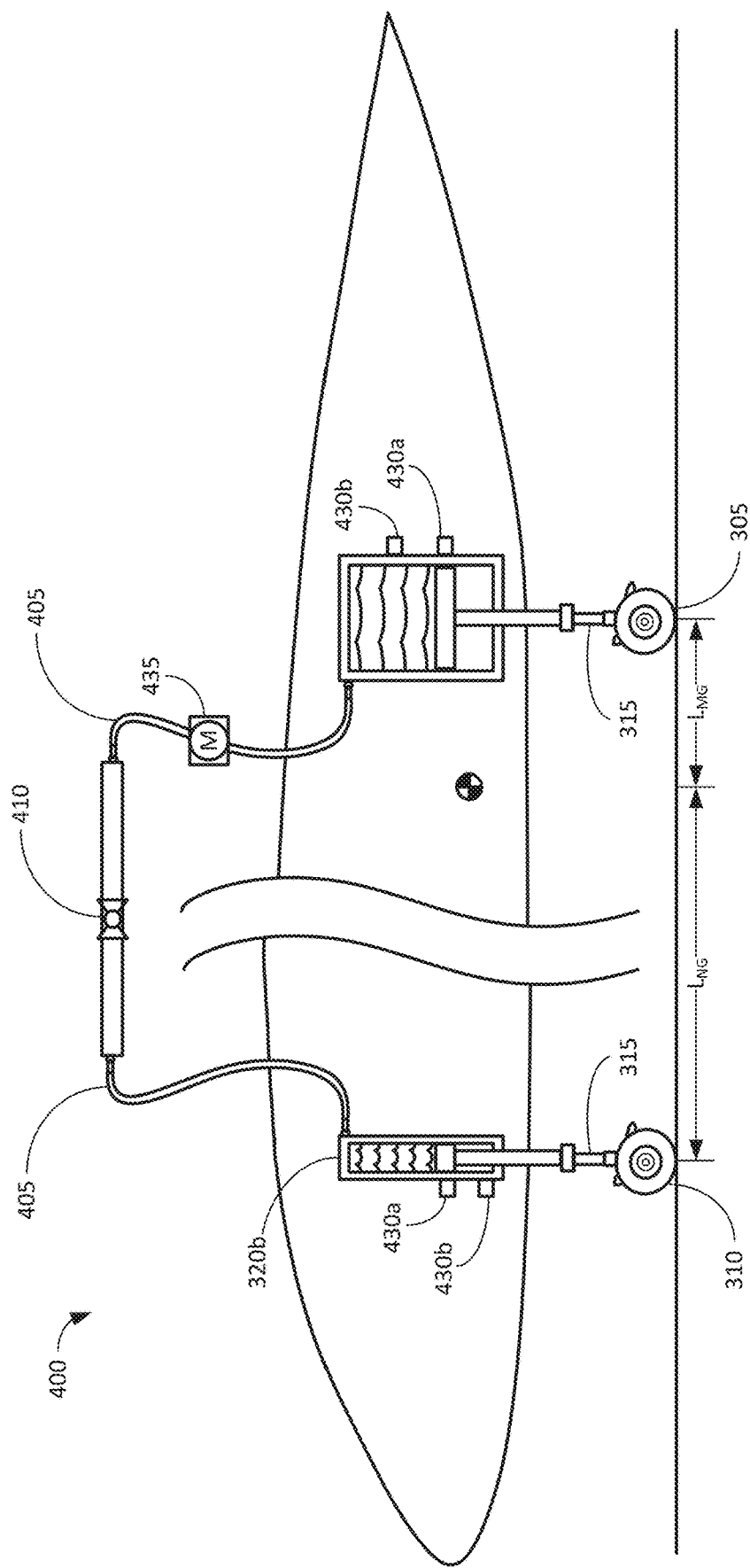

As shown in FIGS. 4A and 4B, in some examples, the system 400 can be essentially passive. In this configuration, the hydraulic cylinders 320 can be linked and can be sized and shaped such that they are essentially hydraulically neutral about the $C_G$. In other words, the total area of the piston(s) 415b for the nose hydraulic cylinder 320b and the total area of the piston(s) 415a for the main hydraulic cylinder 320a combined with their relative distances from the $C_G$ can be calculated to balance the aircraft about the $C_G$.

As shown, in some examples, the main hydraulic cylinder 320a can have a larger total piston surface area, $A_{MG}$, (i.e., the combined, or total, piston surface area of the main hydraulic cylinders 320a, if there are multiple main gears 305a) than the total piston surface area, $A_{NG}$, of the nose hydraulic cylinder 320b. In the configuration, the distance, $L_{NG}$, from the nose gear 310 to the $C_G$ can be larger than the distance, $L_{MG}$, from the main gear 305 to the $C_G$ to produce hydro-mechanical equilibrium. Thus, in Equation 1:

$$A_{NG} = \frac{A_{MG}}{\frac{L_{NG}}{L_{MG}}}$$

So, for example, if $L_{NG}=3 \times L_{MG}$, then the $A_{NG}=\frac{1}{3} A_{MG}$ (from 1, $A_{NG}=A_{MG}/3$). The hydraulic cylinders 320 can also be linked with a suitably sized hydraulic pipe 405 (e.g., a pipe or hose).

This system allows very small force to rotate the aircraft about its $C_G$ despite the placement of the landing gear 305, 310 farther from the $C_G$. In other words, by balancing the hydraulic forces between the nose hydraulic cylinder(s) 320b and the main hydraulic cylinder(s) 320a, a virtual pivot about the $C_G$ is created. Thus, a small downward force at the rear of the wing from the flight control surfaces 120 can cause the aircraft to rotate for takeoff. Similarly, a small braking force from the aircraft's brakes can cause the aircraft to de-rotate from the landing position to the ground position, for example.

In some examples, it may be desirable to include a hydraulic valve 410 between the hydraulic cylinders 320. In this manner, the hydraulic cylinders 320 can be locked in a particular position. The hydraulic valve 410 can be, for example, a ball valve, gate valve, or throttle valve.

In the level, or ground position, therefore, both hydraulic cylinders 320 can be positioned such that the oleo struts 315 are in substantially the same position and the aircraft fuselage is substantially level. In some examples, the aircraft may have a very slightly nose heavy configuration. This can be achieved passively with the difference in deadweight of the landing gear, for example, or by using a small pump 435 to provide a slight bias of fluid to the main hydraulic cylinder 320a. When the hydraulic valve 410 is open (or there is no hydraulic valve), therefore, the nose hydraulic cylinder 320b can retract and the main hydraulic cylinder 320a can extend. In some examples, the aircraft can be in the ground position when the nose hydraulic cylinder 320b is completely retracted, or "bottomed out."

As shown in FIG. 4B, to achieve the desired AOA, the nose hydraulic cylinder 320b can be extended and the main hydraulic cylinder 320a can be retracted. This can be achieved in a number of ways. Since the system 400 is balanced about the $C_G$, for example, a small downward force from the flight control surfaces 120 can cause the aircraft to rotate about the $C_G$ to the AOA position.

If a hydraulic valve 410 is included, the hydraulic valve 410 can first be placed in the open position. Because the aircraft is in equilibrium, however, opening the hydraulic valve 410 does not, in itself, create any rotation. As before, the rotation can be provided by small forces provided by the flight control surfaces 120. In some examples, the aforementioned pump 435 can be reversed to cause fluid to flow from the main hydraulic cylinder 320a to the nose hydraulic cylinder 320b. This, in turn, causes the main gear 305 to squat and the nose landing gear 130 to extend creating the desired AOA. In any configuration (i.e., with or without a hydraulic valve 410 or a pump 435), the amount of energy required to cause the rotation is significantly smaller because the aircraft is essentially balanced about the $C_G$.

As discussed below, in some examples, the system 400 can include a control system to control the position of the hydraulic cylinders. In some examples, the system 400 can comprise one or more sensors to detect the AOA. In some examples, the system 400 can include a tilt sensor 420 disposed on the aircraft to detect the AOA. In some examples, the tilt sensor 420 can comprise the attitude sensor included in the aircraft's exiting avionics package. In other examples, the tilt sensor 420 can comprise a separate gyro, accelerometer, or similar sensor to detect the AOA. In other examples, the system 400 can include one or more position sensors 425 located on the hydraulic cylinders 320. Based on the position of the hydraulic cylinders 320 and the geometry of the system, the AOA can be calculated.

In still other examples, the system 400 can include one or more switches 430 located on the hydraulic cylinders 320. In this configuration, the system 400 can simply comprise two or more positions for various flight situations. The system 400 can include one switch 430a for each cylinder in the ground position (FIG. 4A), for example, and one switch 430b on each cylinder for the takeoff position (FIG. 4B). The system 400 can also comprise additional switches for additional positions (e.g., landing, heavy payload, etc.).

In some examples, the system 400 can be completely passive. In other words, in some examples, the system 400 can move from the ground position (FIG. 4A) to the takeoff position (FIG. 4B) based solely on the small aerodynamic force provided by the flight control surfaces 120. Similarly, after takeoff, the system 400 can move back to the ground position, for example, because the total weight of the main gear 305 is generally significantly heavier than the total weight of the nose gear 310. After takeoff, therefore, the hydraulic valve 410 can remain open (or be reopened) to enable the total weight of the main gear 305 to extend the main hydraulic cylinder 320a and compress the nose hydraulic cylinder 320b back to the level position. In other examples, as discussed below, hydraulic pumps, motors, or other power assist can be used.

As mentioned, the system 400 can also comprise a hydraulic motor or pump 435. The pump 435 can be used to actively reposition the landing gear 305, 310 despite loading. In other words, in some examples, it may be desirable to raise the nose gear 310 despite the fact that the aircraft is in a nose heavy configuration. In this configuration, opening the hydraulic valve 410 may cause the nose hydraulic cylinder 320b to collapse. In this case, the pump 435 can be activated to provide the desired forward pressure. In some examples, the pump 435 can be reversible, enabling it to pump fluid in either direction to affect rotation in either direction (e.g., nose up/mains down and nose down/mains up). In some examples, the pump 435 can be activated only when the system 400 determines that the landing gear 305, 310 is not moving in the desired direction.

In addition to providing equilibrium about the $C_G$, the different relative sizing of the hydraulic cylinders 320 also cause a proportionally different stroke, S, for each of the cylinders. This relationship is given in Equation 2:

$$\frac{L_{NG}}{L_{MG}} = \frac{S_{NG}}{S_{MG}}$$

Figure 5:
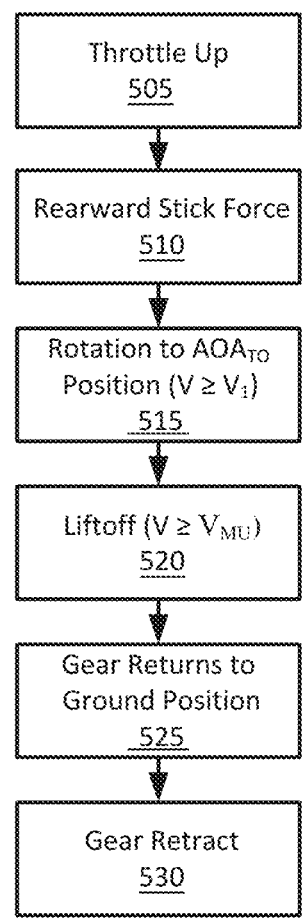
FIG. 5 is a flowchart depicting a method for passively controlling the rotating landing gear system on takeoff, in accordance with some examples of the present disclosure.

Referring now to FIG. 5, a method 500 for mechanically rotating an aircraft is shown. In the "passive" configuration, the method 500 can rely on the mechanical and hydraulic layout to effect movement of the aircraft. At 505, as in a convention aircraft, takeoff can begin with the engines being throttled up to the takeoff power setting. In a conventional aircraft, the pilot can simply pull back on the stick during the takeoff roll. When the aircraft reaches a predetermined velocity, or $V_1$, the velocity of the plane will be such that the aerodynamic surfaces of the aircraft rotate the nose of the aircraft into the air about the main gear.

Figure 1A:
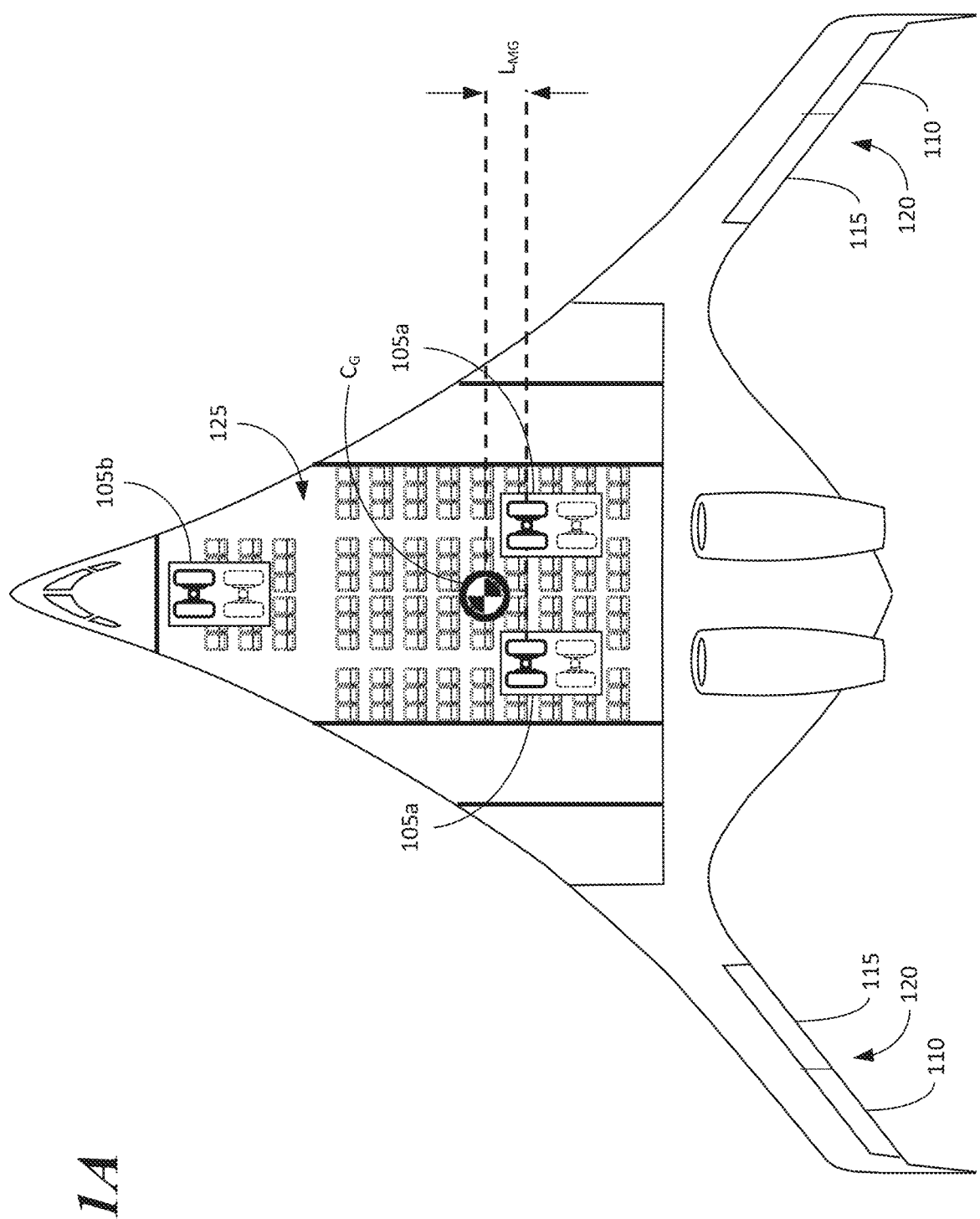
FIGS. 1A and 1B are plan and side views, respectively, depicting a blended-wing aircraft with the landing gear in a convention location near the center-of-gravity (CG) and inside the passenger or cargo compartment.
Figure 1B:
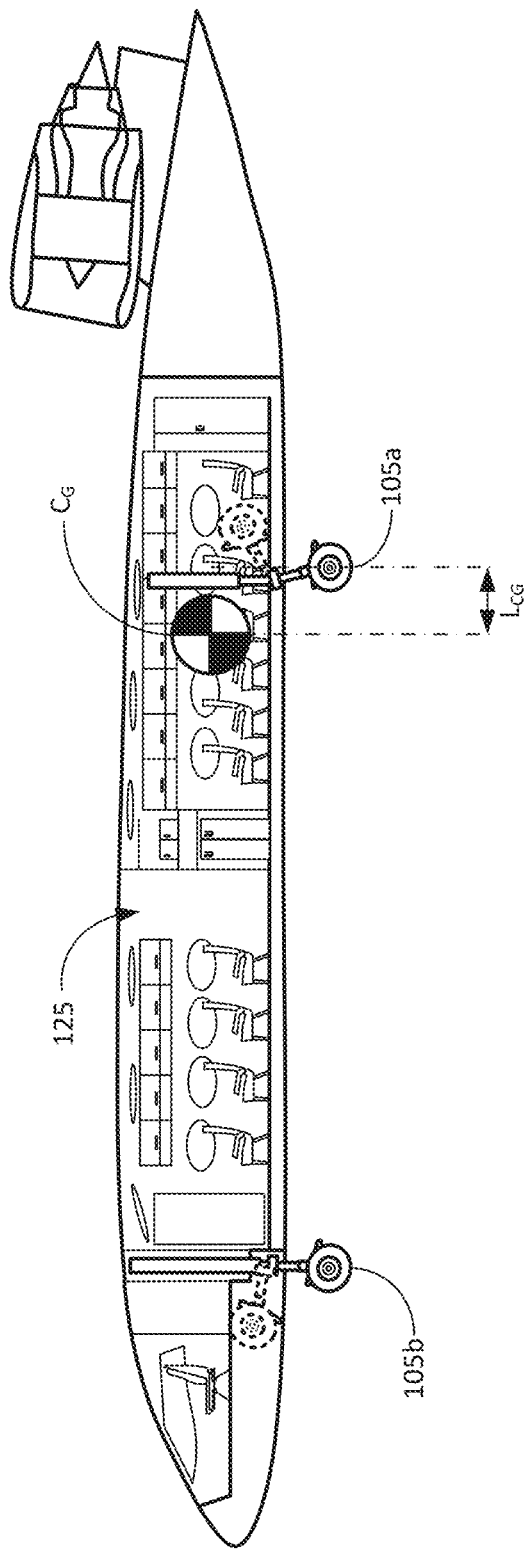
Figure 2A:
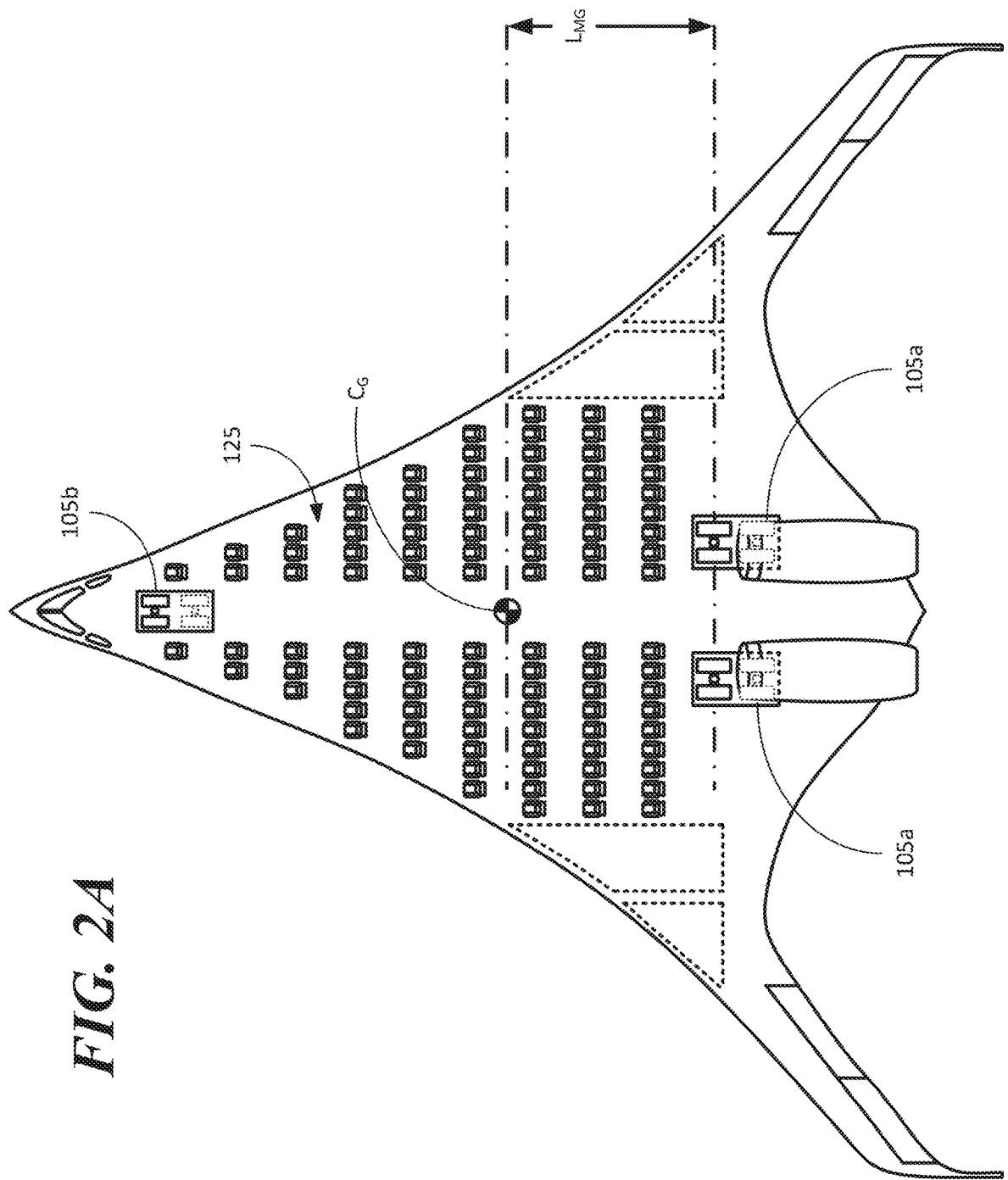
FIGS. 2A and 2B are plan and side views, respectively, depicting a blended-wing aircraft with the main landing gear in a rearward location farther from the CG to improve packaging.
Figure 2B:
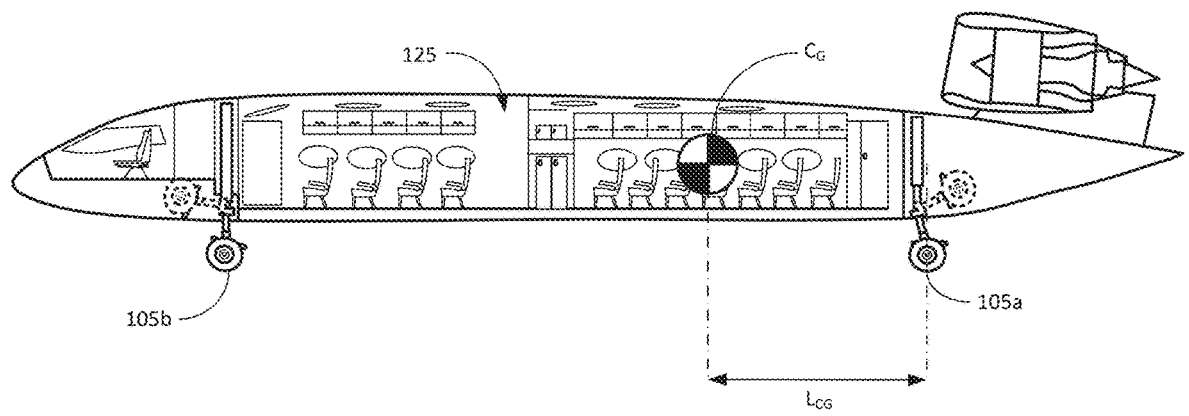

As discussed above, in a blended wing configuration with a rearward main gear 305 placement, for example, the flight control surfaces 120 would normally be unable to create sufficient force to affect rotation. This is due in part to the longer distance between the main gear 305 and the $C_G$ (e.g., as shown in FIGS. 2A and 2B). As discussed above, due to the hydraulic equilibrium created by the size, shape, and positioning of the hydraulic cylinders 320, however, rotation about the $C_G$ can be provided with very little force from the flight control surfaces 120.

To this end, as the aircraft accelerates, at 510 the pilot can apply rearward pressure on the stick to deflect the elevons 110 (or elevons, as the case may be). At 515, when the aircraft reaches the speed at which the aerodynamic forces overcome the inertial of the aircraft, the aircraft can rotate about the $C_G$ to the AOA for takeoff, $AOA_{TO}$. As discussed above, because the aircraft is essentially in equilibrium on the ground, very little force is required for the aircraft to rotate.

As a result, the "Minimum Unstick Speed" (VMU) can be low enough that it is not the critical condition for establishing Takeoff Decision Speed ($V_1$). As a result, V1 will generally be a substantially lower speed than would be required with conventional landing gear for any aircraft configuration (e.g., tube and wing vs. blended wing). Indeed, in the blended wing configuration, the force can be reduced from a level that cannot practically be generated using aerodynamics to a force that is lower than is currently required in a conventional tube and wing configuration. This can also significantly improve takeoff distances and climb out because the negative lift that the flight control surfaces 120 create—that the wing must counteract for liftoff—is substantially reduced.

At 520, when the aircraft reaches the minimum unstick speed, or $V_{MU}$, the aircraft will takeoff. As mentioned above, because very little force is required to rotate the aircraft, the amount of lift required to overcome the negative lift created by the elevons 110 and lift the aircraft is reduced. As a result, $V_{MU}$, takeoff roll, and fuel consumption, among other things, can be reduced.

At 525, the landing gear 305, 310 can move to another position, such as the ground position. In some examples, the main gear 305 can be heavier than the nose gear 310. When the aircraft takes off, therefore, the weight of the main gear 305 can cause the main hydraulic cylinder 320a to extend and the nose hydraulic cylinder 320b to retract. In some examples, the ground position can occur when the main gear 305 extends completely (i.e., to the "stops") and the nose gear 310 retracts completely. In this configuration, the landing gear 305, 310 naturally and passively returns to the ground position in the air. Of course, the landing gear 305, 310 could also be configured to return to a landing AOA position or a stowed position (e.g., the position in which the landing gear 305, 310 takes up the minimum amount of space when retracted).

At 530, regardless of the position the landing gear 305, 310 returns to (e.g., ground position, landing AOA position, stowed position, etc.), once the landing gear 305, 310 has reached the desired position, the landing gear 305, 310 can be retracted for flight. In the passive configuration, no valves or pumps are required for takeoff and all aircraft and landing gear 305, 310 positioning is provided either by aerodynamic forces or by the relative weights of the landing gear 305, 310. This passive system reduces the complexity of the system, which can reduce weight, cost, and maintenance, among other things.

Figure 6:
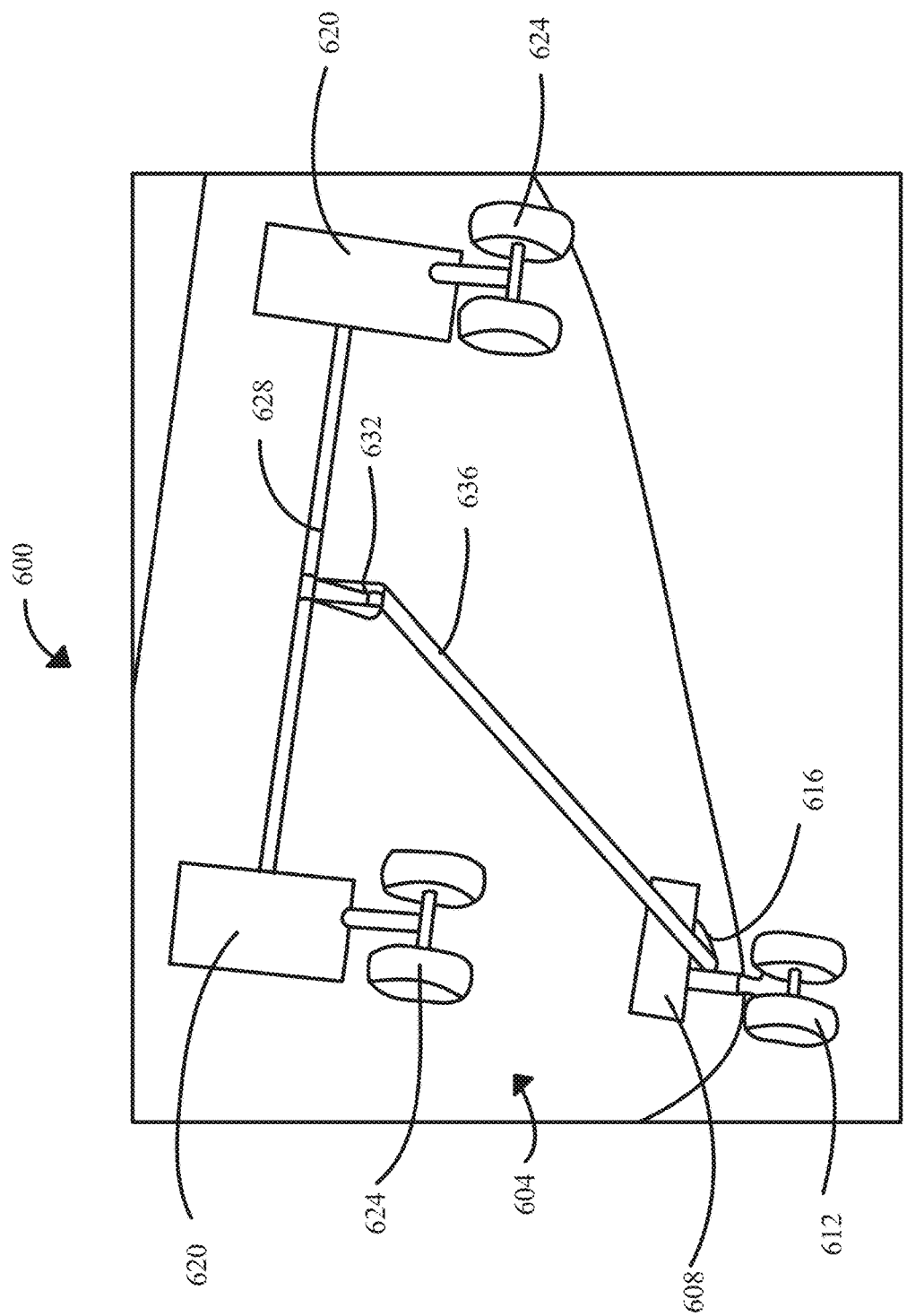
FIG. 6 is an exemplary embodiment of coupled landing gear.

Referring now to FIG. 6, an exemplary embodiment of coupled landing gear apparatus 600 (also referred to as "landing gear") for an aircraft is illustrated. Coupled landing gear may be communicatively connected to a controller 604. Controller 604 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 604 may include a single computing device operating independently, or may include two or more computing device operating in concert, in parallel, sequentially or the like; two or more computing devices may be included together in a single computing device or in two or more computing devices. Controller 604 may interface or communicate with one or more additional devices as described below in further detail via a network interface device. Network interface device may be utilized for connecting controller 604 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 604 may include but is not limited to, for example, a computing device or cluster of computing devices in a first location and a second computing device or cluster of computing devices in a second location. Controller 604 may include one or more computing devices dedicated to data storage, security, distribution of traffic for load balancing, and the like. Controller 604 may distribute one or more computing tasks as described below across a plurality of computing devices of computing device, which may operate in parallel, in series, redundantly, or in any other manner used for distribution of tasks or memory between computing devices. Controller 604 may be implemented using a "shared nothing" architecture in which data is cached at the worker, in an embodiment, this may enable scalability of system 600 and/or computing device.

With continued reference to FIG. 6, controller 604 may be designed and/or configured to perform any method, method step, or sequence of method steps in any embodiment described in this disclosure, in any order and with any degree of repetition. For instance, controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 604 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 6, coupled landing gear apparatus 600 includes at least a nose gear 608. As used in this disclosure, "nose gear" is a landing gear assembly located forward of the neutral point and/or center of gravity of an aircraft. As used herein, "neutral point" is a point about the centerline of the aircraft about which the aircraft rotates without a change in pitching moment. It may also be known as the "aerodynamic center". In a pitch stable configuration, the neutral point may be aft of the center of gravity. Nose gear 608 may be located at the nose of an aircraft. Nose gear 608 may include a nose wheel 612. As used in this disclosure, "nose wheel" is a wheel component within a nose gear landing gear assembly that is configured to make contact with and roll on the ground. Wheel may include a pneumatic tire, or the like. A tire may be composed at least in part of an elastomeric material such as rubber. An aircraft tire may include an interior lumen or sealed chamber, which may also be annular, and which may be filled with pressurized gas to increase the tire's resistance to elastic deformation, permitting it to bear greater weight without allowing the rim to contact the ground. Aircraft tire may be capable of being exposed to temperatures below −40° C. and/or above 200° C. without losing elasticity or integrity. Aircraft tires may be composed of, without limitation rubber, nylon, cord, and/or steel. Aircraft tires may include a tire tread pattern. As used in this disclosure a "tire tread pattern" is a circumferential groove molded into the rubber of the tire to improve traction. For example, and without limitation, a tire tread pattern may be composed of 4 circumferential grooves molded into the aircraft tire to channel water away from the tire surface. In an embodiment and without limitation, tire tread patterns may be designed to maximize the amount of rubber making contact with the ground to decrease the landing distance and/or enhance braking performance. Nose gear 608 may be connected to a nose linkage 616. A nose linkage 616 may be a sector, gear, cam, or the like, which helps translate motion from one gear to another. As used herein, a "sector" is a partial pully that provides extension to a system. A sector may be composed of materials such as aluminum, steel, polycarbonate, carbon fiber, fiber glass, or the like. A sector may act as a cam, such that it creates a relationship between cable motion of a main cable, as discussed below, and rotary motion of a shaft, such as a lateral shaft as discussed below. In an embodiment, compression of a suspension attached to a nose wheel 612 may translate to the nose linkage 616 such that it provides extension to a main gear 620. Suspension is discussed in further detail below. In another embodiment, nose linkage 616 may transfer the movement of a main gear 620 to movement of the nose wheel 612.

Figure 9:
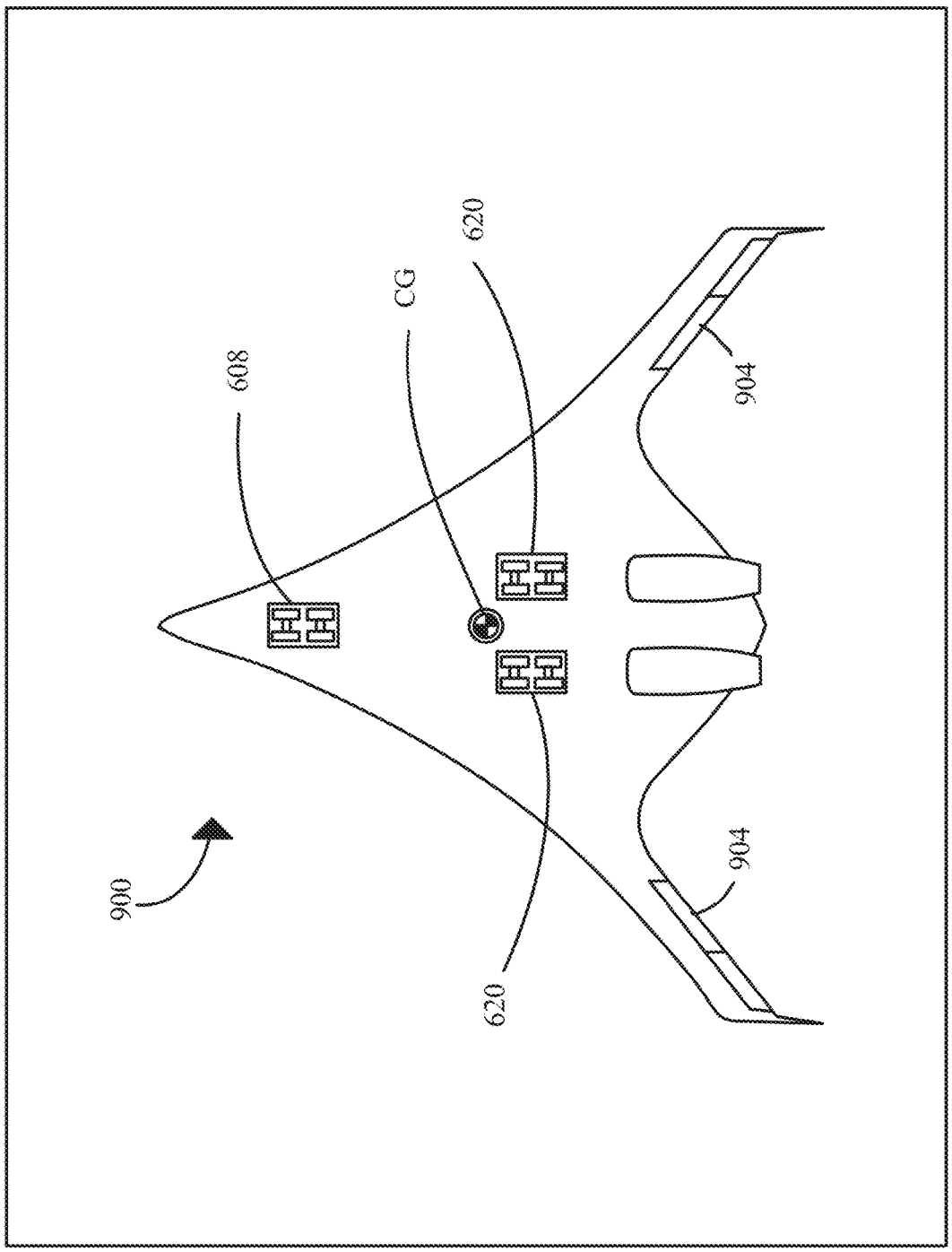
FIG. 9 is a depiction of a tricycle landing gear arrangement.

With continued reference to FIG. 6, coupled landing gear apparatus 600 includes a main gear 620. As used in this disclosure, "main gear" is a landing gear assembly located aft of the neutral point and/or center of gravity of an aircraft. A main gear may be a tail gear, such that it is located far aft of the neutral point and/or center of gravity, near the tail of the aircraft. Main gear 620 may include a main wheel 624. As used in this disclosure, "main wheel" is a wheel component within a main gear landing gear assembly that is configured to make contact with and roll on ground. Wheel may include a pneumatic tire, or the like, such as a tire as discussed above. Main gear 620 and nose gear 608 may be placed in a tricycle arrangement. As used herein, a "tricycle arrangement" is an arrangement where in at least 3 components form a triangular shape. In an embodiment, there may be two main gears 620 connected to two main wheels and one nose gear 608 connected to one nose wheel such that the three gear assemblies with wheels may form a tricycle arrangement. This arrangement is shown in FIG. 9. Alternatively, a tricycle formation may include two nose gears and one main gear 620. Alternatively, coupled landing gear apparatus 600 may be in a bicycle formation. As used herein, a "bicycle formation" is an arrangement wherein at least two components that are nearly or directly behind each other. In this embodiment, the nose gears and main gears may be located on or close to the aircraft's centerline. Furthermore, there may be one or more struts located ahead of the aircraft's neutral point and/or center of gravity, and one or more struts located aft of the neutral point and/or center of gravity. There may be additional minor landing gear located outward from the centerline to provide stability to the aircraft. There may be more than one wheel attached to each gear assembly, such as the nose gear 608 and the main gear 620. In an embodiment, coupled landing gear apparatus 600 may be in a quadracycle formation. As used herein, a "quadracycle formation" is an arrangement wherein at least 4 components are disposed in a rectangular shape. For example, there may be two nose gears and two main gears positioned such that the four gears form a rectangular shape, much like the four wheels of a car. The coupled landing gear apparatus 600 may be mechanically linked. As used in the current disclosure, "mechanically linked" is when the fore and the aft landing gear (nose and main landing gear, respectively) are configured to move along the vertical axis in tandem. As used herein, "in tandem" means that the main gear and the nose gear work together, such that one affects the other. In embodiments, when the pair of aft landing gear rises the fore landing gear may be lowered. In other embodiments, when the fore landing gear rises the aft landing gear may lower. The main gear 620 and the nose gear 608 are in communication with each other. As used in this disclosure, "communication" is a mediated relationship, for example between a first relatum and a second relatum, that allows the first relata to affect an aspect of the second relata or vice versa. Communication may include fluidic communication, wherein communication between relata is mediated by fluid (e.g., fluid pressure, fluid flow, or the like); mechanical communication, wherein communication between relata is mediated by a mechanical relationship, such as a mechanism or pseudo-mechanism (e.g., mechanical force or torque, mechanical velocity or angular velocity, or the like); digital and/or analog communication, wherein communication between relata is mediated by signals (e.g., digital or analog signals); or the like. Fluidic communication includes without limitation pneumatic communication, where the medium is compressible fluid, like gas or air, and hydraulic communication, where the medium is incompressible fluid, such as water. Main gear 620 may be coupled to a lateral shaft 628. Lateral shaft may be a torque tube. A "torque tube" as used herein, transmits force by torsion. A main linkage 632 may be located on the lateral shaft 628. In some embodiments, lateral shaft may be a hollow member such as a tube. Main linkage 632 may be located at the center of the lateral shaft 628. Main linkage 632 may be located partially off center of the lateral shaft 628. Main linkage 632 may transform movement of the lateral shaft 628 into movement of the nose gear 608. Main linkage 632 may include a sector, cam, gear, or the like. Lateral shaft may receive movement from main gear 620. Alternatively, or additionally, main linkage 632 may transform movement of nose gear 608 to movement of main gear 620.

Continuing to reference FIG. 6, main linkage 632 and nose linkage 616 may be connected by a longitudinal member 636. Longitudinal member 636 may be a tension cable. Longitudinal member may be a bar, tube, chain, belt, or the like, which translates movement from one sector to another. In some embodiments, longitudinal member 636 may be a central cable. In some embodiments, longitudinal member 636 may comprise a plurality of cables. Longitudinal member 636 may run down the centerline of the aircraft, longitudinally. Longitudinal member 636 may comprise a plurality of cables, including a dual set of cables on opposite sides of the aircraft's centerline. Longitudinal member 636 may be driven by the main linkage 632 and/or the nose linkage 616 such that movement from one linkage may be translated through the longitudinal member 636 and affect the other linkage. Longitudinal member 636 may be a continuous loop of cables that engage through the main linkage 632 and the nose linkage 616. Longitudinal member 636 may be the "rope" that threads through the partial pulleys. Longitudinal member 636 may be composed of materials such as KEVLAR, TECHNORA, VECTRAN, and/or SPECTRA. Longitudinal member 636 may also be composed of metals such as steel, aluminum, titanium, or the like. Longitudinal member 636 may accommodate differential thermal expansion between the cable and an airframe of the aircraft, which is discussed in further detail in FIG. 11.

Continuing to reference FIG. 6, landing gear 600 is configured to decrease torque required to rotate in a pitch axis. In an embodiment, both the main gear 620 and the nose gear 608 may extend or compress to increase, decrease, or modify a pitch of the aircraft, thus providing the desired angle of attack for takeoff and/or landing. During takeoff, landing gear 600 may allow aircraft to rotate to increase pitch to generate lift. During landing, landing gear 600 may allow an aircraft to de-rotate to decrease pitch to decrease lift. In the instance that the main gear 620 is compressed, the nose gear 608 may react by being extended, or vice versa. Because the main gear may be placed behind the pressurized cabin, aft of the neutral point and/or center of gravity, and the nose gear forward of the neutral point and/or center of gravity, torque required to rotate in the pitch axis may be decreased. The placement of the gears means that the moment arm in relation to the neutral point and/or center of gravity is long, therefore less force/torque is needed to rotate the aircraft longitudinally.

Continuing to reference FIG. 6, landing gear 600 may be linked with alternative methods. In an embodiment, the main gear 620 connected to the lateral shaft 628 may be linked to the nose gear 608 using a series of gears, cranks, horns, bell cranks, and the like. These mechanical connections may provide coupling such that movement in the nose gear 608 may cause movement in the main gear 620 or vice versa. In some embodiments, the mechanical connection may include a mechanical power source. A "mechanical power source" is any system or device that generates mechanical power or work, for example a motor, an engine, an actuator, a pump, and the like. A mechanical power source may be controlled by controller 604 such that the controller 604 may determine how much power to provide to each mechanical power source to rotate and/or de-rotate the aircraft.

In some embodiments, and continuing to reference FIG. 6, landing gear 600 may include electromechanical components. For example, a suspension, shown in FIGS. 7 and 8, may be tuned such that there is a relationship between the nose gear 608 and the main gear 620 given a certain loading on either the nose wheel 612 or the main wheel 624. Tuning may consist of programming from a controller 604 such that a force on a nose component may cause an opposite reaction on a main component. For example, a sensor, such as a pressure sensor, on the nose gear 608 may sense that the nose gear 608 is up, which may force the main gear 620 down. In an embodiment, actuators located on the main gear 620 and/or the nose gear 608 may actuate the gears to extend and/or compress the suspension attached to both gears. In an embodiment, the sectors, which are actuators, may be adjusted to extend or compress the landing gear. Extending or compressing the landing gear may vary the angle of attack of the aircraft. Increasing the angle of attack may be beneficial for takeoff as it decreases the amount of torque require to rotate the aircraft longitudinally. Decreasing the angle of attack may be beneficial for landing as it allows for faster braking, and the like.

Still referring to FIG. 6, in some embodiments, system 600 may additionally include a mechanism to fold and/or unfold (i.e., hinge and/or unhinge) landing gear. When landing gear is lowered (i.e., extended) it may be positioned in order to make contact with ground, for instance for take-off, taxiing, parking, and/or landing. When landing gear is raised (i.e., retracted) is may be positioned to reduce drag while aircraft is in flight. In some cases, raised landing gear may be positioned within a housing inside an outer mold line (OML) of aircraft, such that landing gear does not interacting with passing air and does not affect aircraft drag. Aircraft design is often constrained for size and in some cases, landing gear housing may be space constrained. In order to address this, landing gear may be configured to fold into a smaller envelope when not in use. For example, in some cases, nose gear 608 may additionally include a nose gear actuator. As used in this disclosure, "nose gear actuator" is a system that is configured to fold and/or unfold nose gear 608. In some cases, main gear 620 may additionally include a main gear actuator. As used in this disclosure, "main gear actuator" is a system that is configured to fold and/or unfold main gear 620. In some cases, a gear actuator may include an actuator applying mechanical work to a landing gear assembly, for example by way of a crank, a cam, a lead screw, and the like. Exemplary actuators include without limitation hydraulic actuators, pneumatic actuators, mechanical actuators, electric actuators, and the like. In some cases, controller 604 may be configured to control one or more of nose gear actuator and main gear actuator. For example, in some cases, controller 604 may raise and lower nose gear 608 and main gear 620. Additionally, gear sensors may be used in association with gear actuators. Gear sensors may be used to detect a status of extension/retraction and/or folding/unfolding of nose gear 608 and/or main gear 620. For example, in some cases gear sensors may detect when landing gear is completely extended/retracted and/or folded/unfolded, for instance by using one or more proximity sensors. Exemplary proximity sensors may include without limitation, switches, ultrasonic proximity sensors, time of flight (ToF) sensors, linear encoders, rotational encoders, and the like. Gear sensors may also include electrical sensors, imaging sensors, force sensors, Hall effect sensors, airspeed sensors, and the like. Gear sensors may be in communication with controller 604. Controller 604 may control one or both of nose gear actuator and main gear actuator using feedback from gear sensors.

With continued reference to FIG. 6, an actuator, such as those discussed above, may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIG. 6, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 6, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 6, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 6, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 6, in some embodiments, aircraft may include a blended wing body (BWB) aircraft. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft at a leading edge of the wings. For example, a BWB 1104 aircraft may have distinct wing and body structures, which are smoothly blended together with no clear dividing line or boundary feature between wing and fuselage. In some cases, a BWB 1104 may be understood as a hybrid shape that resembles a flying wing, but also incorporates features from conventional aircraft. In some cases, this combination may offer several advantages over conventional tube-and-wing airframes. In some cases, a BWB airframe 1104 may help to increase fuel economy and create larger payload (cargo or passenger) volumes within the BWB. BWB 1104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume.

Figure 7:
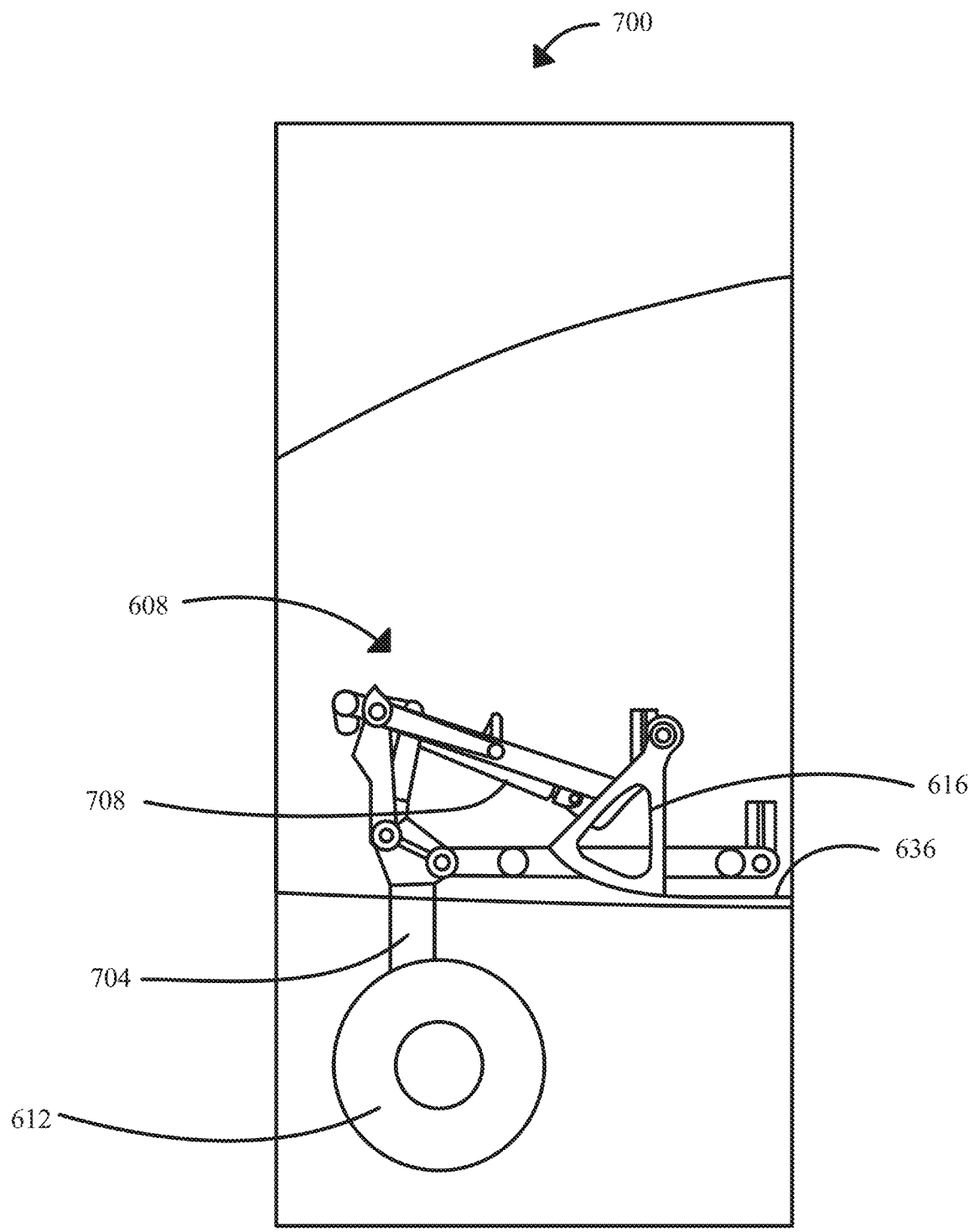
FIG. 7 illustrates an embodiment of a nose gear.

Now referencing FIG. 7, an embodiment 700 of a nose gear 608 on an aircraft is shown. Nose gear may include a suspension 704. Suspension 704 may be mechanically connected to a nose wheel 612. As used herein, "mechanically connected" is where two or more members are joined with one or more mechanical fasteners such that moving one member will directly or indirectly move a second member. Suspension may include a pneumatic shock absorber that may include air or oil, such as an oleo strut. Suspension 704 may include a cylinder and a piston to act as a damper/shock absorber. Suspension 704 may be passive, such that no computing device or external sources are necessary to dampen an impact on suspension 704.

Continuing to reference FIG. 7, nose gear 608 may include a pivot piston 708. A "pivot piston" as used herein, translates vertical movement into lateral movement. A pivot piston may include a rotating rod. Pivot piston 708 may be mechanically connected to the nose linkage 616 and the suspension 704 and nose wheel 612. In an embodiment, movement in the nose wheel may compress the suspension 704 which may cause the pivot piston 708 to rotate the nose linkage 616. As a result, the nose linkage 616 may pull the longitudinal member 636, affecting the main gear on the other end of the longitudinal member 636.

Figure 8:
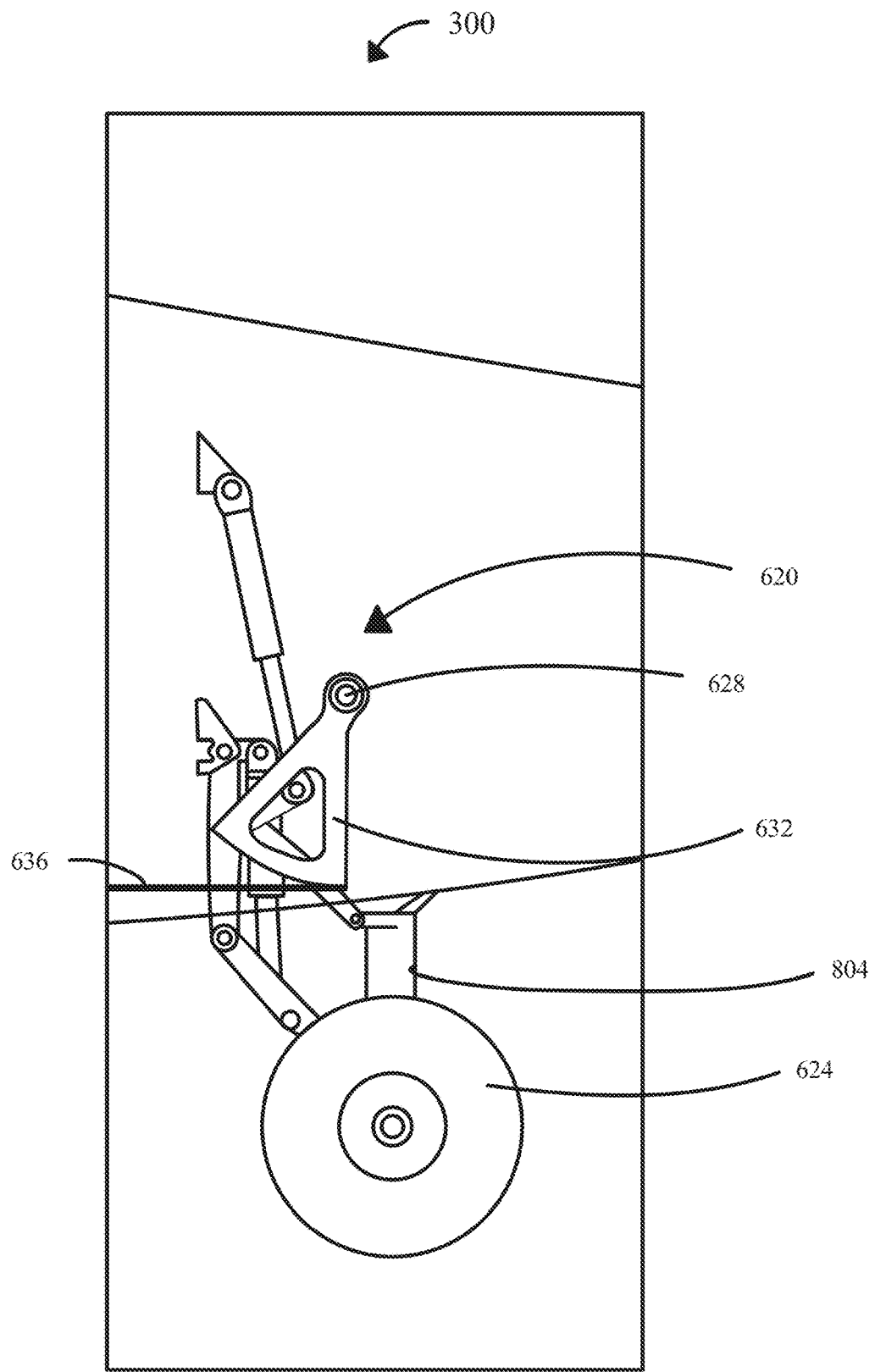
FIG. 8 illustrates an embodiment of a main gear.

Now referencing FIG. 8, an embodiment 800 of a main gear 620 on an aircraft is shown. Main gear 620 may include a suspension 804. Suspension 804 may be mechanically connected to a main wheel 612. Suspension 804 may be consistent with any suspension, such as suspension 704. Main gear 620 may include a lateral shaft 628, as discussed above, that may be connected to two main gears 620. Lateral shaft may have torsional rigidity to provide resistance to an airplane roll. In an embodiment, an uneven force may be applied to main wheels in a tricycle formation. Lateral shaft 628 may stabilize the aircraft to prevent the aircraft from rolling due to the uneven forces. Lateral shaft may be composed of materials with torsional rigidity and shear strength, such as metals like steel or aluminum.

Continuing to reference FIG. 8, main gear 620 may include a main linkage 632. Main linkage 632 may be connected to lateral shaft 628, as discussed above. Main linkage 632 may be mechanically connected to the longitudinal member 636, such that the cable and the main linkage 632 are coupled.

In an example, without limitation, and referring to FIG. 7 and FIG. 8, main gear 620 may compress during takeoff. The compression of suspension 804 may create torsion in the lateral shaft 628. The lateral shaft 628 may be coupled to the main linkage 632. The main linkage 632 may rotate, as a result of the torsion in the lateral shaft 628, to pull the longitudinal member 636 towards the aft of the aircraft (to the right in FIG. 8), creating tension in the longitudinal member 636. As a result, the nose linkage 616 may be pulled by the longitudinal member 636 in the direction towards the aft of the aircraft (to the right in FIG. 7). The nose linkage 616 may expand/extend the pivot piston 708, which extends the nose suspension 704. This may increase the angle of attack of the aircraft as the nose gear 608 is lengthened and the main gear 620 is compressed. In another example, the opposite may happen such that the main gear 620 may extend and the nose gear 608 may compress.

Now referencing FIG. 9, a depiction of a tricycle landing gear arrangement 900 on an aircraft is shown. In some embodiments, landing gears may support the aircraft at a selected angle with respect to the ground surface. The angle of the aircraft may determine the AOA of the wings in a blended wing aircraft as, in a blended wing aircraft, the wings may be in a fixed position. Adjusting the angle of attack would entail adjusting the angle of the aircraft, such as by using landing gears discussed herein. An airplane may be supported at an angle that results in an angle of attack when moving that provides a zero lift coefficient (zero lift). This angle may result in minimum drag while on the takeoff roll. This may favorably reduce the takeoff roll distance. This angle may also result in the full weight of the airplane on the landing gears following landing and de-rotation. This benefits braking force and favorably reduces landing distances. This arrangement tends to increase the airspeed at which the airplane is able to rotate which in turn increases takeoff field length, a drawback. In other embodiments, the aircraft may be supported at a nose-high angle that enables takeoff without rotation. This angle may be as great as that of a comparable airplane when it rotates for takeoff. Alternatively, it may be less than that angle. In another embodiment, aircraft may be supported at an angle in between 0 and a nose-high angle. In this embodiment, the angle may provide low drag on the takeoff roll, rotation due to combined forces from the wing and tail, and a short landing field due to good braking.

In some embodiments, and continuing to reference FIG. 9, tricycle landing gear arrangement 900 may include a two-position nose gear 608. In this embodiment, the main gear 620(s) may be fixed and only the nose gear 608 may adjust between two lengths. One length may provide a shorter suspension for a low AOA. The other length may provide a longer suspension and a greater AOA. Suspension is discussed in further detail in FIG. 6. This embodiment may be passive such that a flight controller does not need to rotate or de-rotate the aircraft for takeoff and landing. A short suspension may be used for landing. This may provide good braking on the roll out and avoid contacting the nose gear 608 first at touchdown. A long suspension may be used for takeoff, which may provide additional wing lift, helping the aircraft takeoff. Aircraft may include a main gear 620 a short distance behind the neutral point and/or center of gravity of the aircraft, shown in FIG. 9. A two-position nose gear 608 may improve takeoff performance as a higher AOA generates more lift.

In some embodiments, and continuing to reference FIG. 9, tricycle landing gear arrangement 900 may include a jump strut. As used herein, a "jump strut" is a dampener that resists vertical compression that is often part of the suspension of a landing gear. Jump strut may be found on the nose gear 608. Jump strut may be varied in length during the takeoff roll, similar to the two-position gear. Jump strut may vary in length gradually or more rapidly. Gradual extension may be at 0.01 m/s or 0.001 m/s, or the like. Rapid extension may be at 1 m/s, 0.1 m/s, or the like. During gradual extension, aircraft have a nose-low AOA during roll but a high AOA during takeoff, which may reduce the need for an aerodynamic pitching moment to rotate. During a rapid extension, full extension may be achieved when aircraft reaches rotation speed. In an embodiment, this may achieve a positive pitch rate at the end of the nose gear 608 extension, which may propel the nose even higher, reducing takeoff distance. Jump strut may only extend after a decision to take off is made, the jump strut preserves good breaking characteristics in case of an abandoned takeoff, as the nose remains in a low AOA. A decision may be made by a user, such as a pilot controlling the aircraft. During landing, the jump strut may remain in the "short" position, permitting a conventional landing de-rotation. A "short" position during landing may benefit braking, improve steering, and decrease lift.

Continuing to reference FIG. 9, in some embodiments, tricycle landing gear arrangement 900 may include a conventional landing gear, also referred to as a "tail dragger". In this tricycle arrangement, the nose gear 608 may include two gears located ahead of the aircraft's neutral point and/or center of gravity, and one main gear 620 located at the aft end of the fuselage, far from the aircraft's neutral point and/or center of gravity. In this arrangement, takeoff rotation may be achieved by lifting an elevator 904, located on the tail of the aircraft and discussed in further detail below. Landing may be at higher airspeeds with a reduced deck angle (0 AOA) or could be at a high AOA at a lower airspeed. Tail dragger arrangement may enable an easy rotation with little control power necessary.

Figure 10:
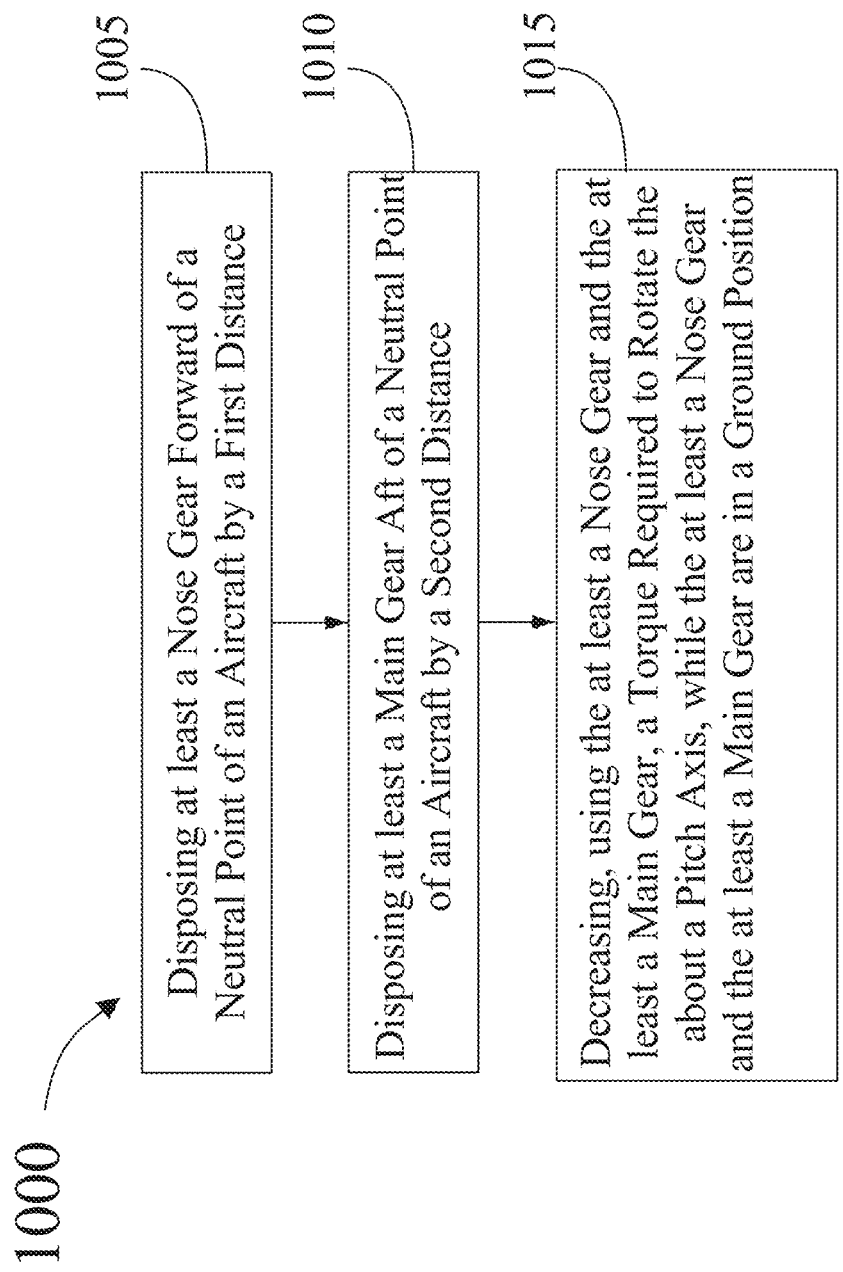
FIG. 10 is a flow diagram of a method of using a coupled landing gear.

Now referencing FIG. 10, a method 1000 for using a coupled landing gear for an aircraft is shown. Step 1005 of method 1000 includes disposing at least a nose gear forward of a neutral point and/or center of gravity of an aircraft by a first distance. A first distance may be 10 ft, 10 ft, 1 ft, or the like from the neutral point and/or center of gravity. Nose gear may be connected to a nose linkage which may be configured to respond to changes in a main gear. This may be implemented as disclosed with reference to FIGS. 6-9 above, and FIG. 11 below.

With continued reference to FIG. 10, step 1010 of method 1000 includes disposing at least a main gear aft of the neutral point and/or center of gravity of the aircraft by a second distance. A second distance may be 5 ft, 10 ft, 1 ft, or the like away from the neutral point and/or center of gravity. The main gear and the nose gear may form a tricycle arrangement. In an embodiment, there may be one nose gear forward of the neutral point and/or center of gravity and two main gears aft of the neutral point and/or center of gravity. In another embodiment, there may be two nose gears forward the neutral point and/or center of gravity and one main gear aft of the neutral point and/or center of gravity. This may be implemented as disclosed with reference to FIGS. 6-9 above, and FIG. 11 below.

With continued reference to FIG. 10, step 1015 of method 1000 includes decreasing, using the at least a nose gear and the at least a main gear, torque required to rotate the aircraft about a pitch axis, while the at least a nose gear and the at least a main gear are in a ground position. This may be implemented as disclosed with reference to FIGS. 6-9 above, and FIG. 11 below. The landing gear may be configured to permit an increase in an AOA during take-off to decrease the torque necessary to rotate an aircraft about a pitch axis. In an embodiment, during takeoff, the nose gear may be expanded and the main gear may be compressed. The landing gear may be configured to permit a decrease in angle of attack of the aircraft during landing. The nose gear and the main gear may be configured to move in tandem. A longitudinal member may be used to connect, directly or indirectly, the main gear to the nose gear. A relationship between the nose gear and the main gear may include an electromechanically relationship. A controller may be configured to control an actuator to vary the AOA of the aircraft. This may be implemented as disclosed with reference to FIGS. 6-9 above, and FIG. 11 below.

Figure 11:
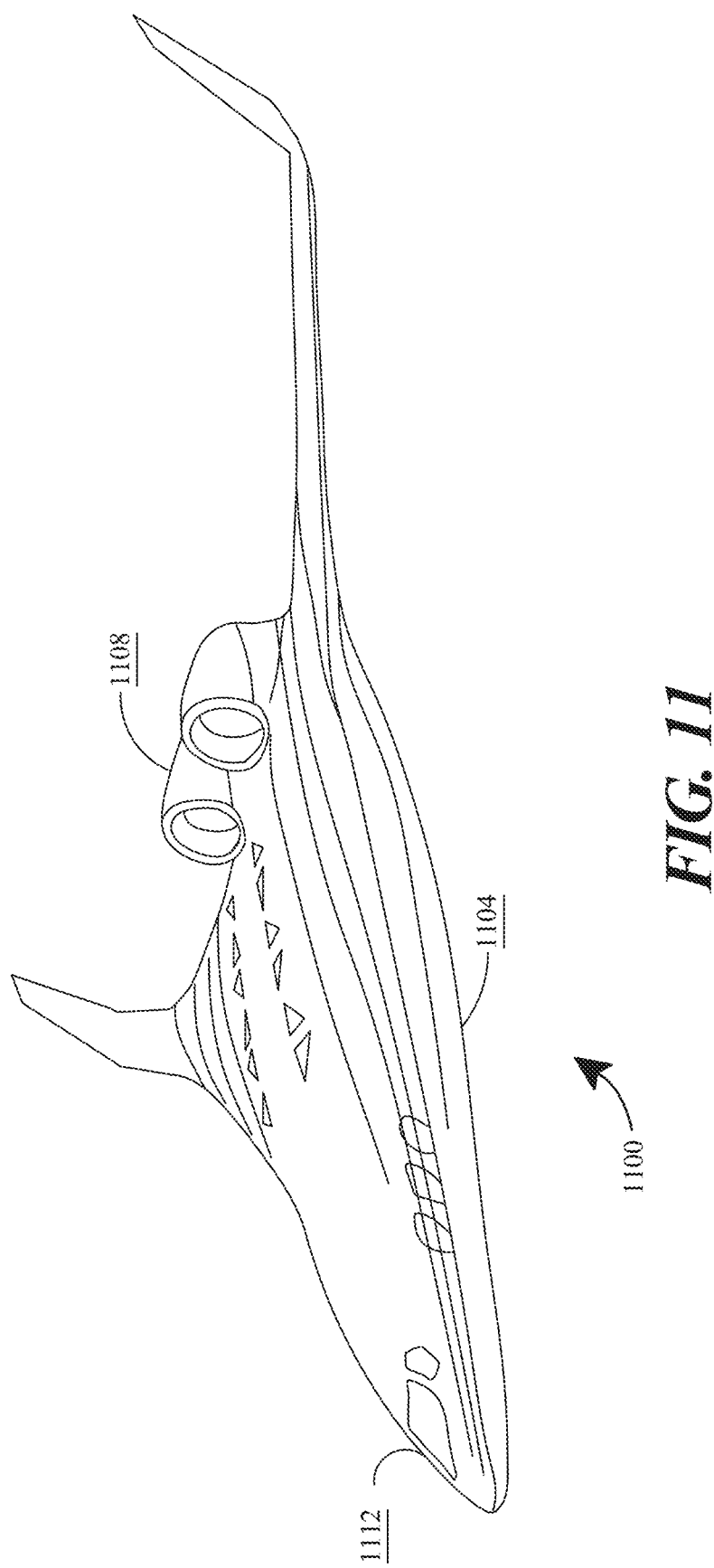
FIG. 11 is an illustration of an exemplary blended wing aircraft.

Referring to FIG. 11, an exemplary blended wing aircraft 1100 is illustrated. Aircraft 1100 may include a blended wing body 1104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 1104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 1104 design may or may not be tailless. One potential advantage of a BWB 1104 may be to reduce wetted area and any accompanying drag associated with a conventional wing-body junction. In some cases, a BWB 1104 may also have a wide airfoil-shaped body, allowing entire aircraft to generate lift and thereby facilitate reduction in size and/or drag of wings. In some cases, a BWB 1104 may be understood as a hybrid shape that resembles a flying wing, but also incorporates features from conventional aircraft. In some cases, this combination may offer several advantages over conventional tube-and-wing airframes. In some cases, a BWB airframe 1104 may help to increase fuel economy and create larger payload (cargo or passenger) volumes within the BWB. BWB 1104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 11, BWB 1104 of aircraft 1100 may include a nose portion. A "nose portion," for the purposes of this disclosure, refers to any portion of aircraft 1100 forward of the aircraft's fuselage 1116. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 11, BWB 1104 may include at least a structural component of aircraft 1100. Structural components may provide physical stability during an entirety of an aircraft's 1100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 1100 structure, they may be so named A, B, C, and so on named from nose to tail. Pillars, like any structural element, may be disposed a distance away from each other, along an exterior of aircraft 1100 and BWB 1104. Depending on manufacturing method of BWB 1104, pillars may be integral to frame and skin, comprised entirely of internal framing, or alternatively, may be only integral to structural skin elements. Structural skin will be discussed in greater detail below.

With continued reference to FIG. 11, BWB 1104 may include a plurality of materials, alone or in combination, in its construction. At least a BWB 1104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 1104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 1104 may additionally or alternatively use wood or another suitably strong yet light material for an internal structure.

With continued reference to FIG. 11, aircraft 1100 may include monocoque or semi-monocoque construction. BWB 1104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 11, BWB 1104 may include at least a fuselage. A "fuselage," for the purposes of this disclosure, refers to a main body of an aircraft 1100, or in other words, an entirety of the aircraft 1100 except for nose, wings, empennage, nacelles, and control surfaces. In some cases, fuselage may contain an aircraft's payload. At least a fuselage may comprise structural components that physically support a shape and structure of an aircraft 1100. Structural components may take a plurality of forms, alone or in combination with other types. Structural components vary depending on construction type of aircraft 1100 and specifically, fuselage. A fuselage 1112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 11, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 1100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 1100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 11, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 11, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 11, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 11, in some embodiments, another common structural form is sandwich structure. As used in this disclosure, "sandwich structure"

includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 11, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 1104. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 11, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 1100 is in its level flight orientation or sitting on ground. A post may act similarly to stringer in that it is configured to support axial loads in compression due to a load being applied parallel to its axis due to, for example, a heavy object being placed on a floor of aircraft 1100. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 11, aircraft 1100 may include at least a flight component 1108. A flight component 1108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 1100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 1100. In some embodiments, at least a flight component 1108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 11, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 11, at least a flight component may be one or more devices configured to affect aircraft's 1100 attitude. "Attitude", for the purposes of this disclosure, is the relative orientation of a body, in this case aircraft 1100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 1100. A plurality of attitude datums may indicate one or more measurements relative to an aircraft's pitch, roll, yaw, or throttle compared to a relative starting point. One or more sensors may measure or detect an aircraft's 1100 attitude and establish one or more attitude datums. An "attitude datum", for the purposes of this disclosure, refers to at least an element of data identifying an attitude of an aircraft 1100.

With continued reference to FIG. 11, in some cases, aircraft 1100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 11, in some cases, aircraft 1100 may include at least a pilot control. As used in this disclosure, a "pilot control," is an interface device that allows an operator, human or machine, to control a flight component of an aircraft. Pilot control may be communicatively connected to any other component presented in aircraft 1100, the communicative connection may include redundant connections configured to safeguard against single-point failure. In some cases, a plurality of attitude datums may indicate a pilot's instruction to change heading and/or trim of an aircraft 1100. Pilot input may indicate a pilot's instruction to change an aircraft's pitch, roll, yaw, throttle, and/or any combination thereof. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. The three axes may include a longitudinal axis, transverse axis, and yaw axis. "Longitudinal axis", as used herein, refers to an imaginary axis that runs along the axis of symmetry of the fuselage. "Transverse axis," also called a "pitch axis," as used herein, runs parallel to a line running from wing tip to wing tip of the aircraft, which is orthogonal to the longitudinal axis. "Yaw axis", as used herein, is an imaginary axis that runs orthogonal to the longitudinal and transverse axis. Aircraft trajectory may be manipulated by one or more control surfaces and propulsors working alone or in tandem consistent with the entirety of this disclosure. "Pitch", for the purposes of this disclosure refers to an aircraft's angle of attack and is aircraft's rotation about the transverse axis. For example, an aircraft pitches "up" when the angle of attack is positive, like in a climb maneuver. In another example, the aircraft pitches "down", when the angle of attack is negative, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Roll" for the purposes of this disclosure, refers to rotation about an aircraft's longitudinal axis. "Yaw", for the purposes of this disclosure, refers to rotation about the yaw axis. As used herein, "throttle", for the purposes of this disclosure, refers to an aircraft outputting an amount of thrust from a propulsor. In context of a pilot input, throttle may refer to a pilot's input to increase or decrease thrust produced by at least a propulsor. Flight components 1108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 11, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 1108. At least a flight component 1108 may include any propulsor as described herein. In embodiment, at least a flight component 1108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 11, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 11, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 11, at least a flight component 1108 may include wings, empennages, nacelles, control surfaces, fuselages, and landing gear, among others, to name a few. In embodiments, an empennage may be disposed at the aftmost point of an aircraft body 1104. Empennage may comprise a tail of aircraft 1100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 1100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 1100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 1104 aircraft 1100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 1108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 1108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 1100. Such devices increase an effective aspect ratio of a wing without greatly increasing wingspan. Extending wingspan may lower lift-induced drag, but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 1100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 11, aircraft 1100 may include an energy source. Energy source may include any device providing energy to at least a flight component 1108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 11, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 1104 of aircraft 1100, for example without limitation within a wing portion 1112 of blended wing body 1108. Aviation fuels may include petroleum-based fuels, or petroleum and synthetic fuel blends, used to power aircraft 1100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 1100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 11, modular aircraft 1100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 11, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 11 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 11, aircraft 1100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 11, aircraft 1100 may include multiple flight component 1108 sub-systems, each of which may have a separate energy source. For instance, and without limitation, one or more flight components 1108 may have a dedicated energy source. Alternatively, or additionally, a plurality of energy sources may each provide power to two or more flight components 1108, such as, without limitation, a "fore" energy source providing power to flight components located toward a front of an aircraft 1100, while an "aft" energy source provides power to flight components located toward a rear of the aircraft 1100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 1108. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 11, aircraft 1100 may include a flight component 1108 that includes at least a nacelle 1108. For the purposes of this disclosure, a "nacelle" is a streamlined body housing, which is sized according to that which is houses, such as without limitation an engine, a fuel store, or a flight component. When attached by a pylon entirely outside an airframe 1104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 1100 partially or wholly enveloped by an outer mold line of the aircraft 1100. At least a nacelle may be designed to be streamlined. At least a nacelle may be asymmetrical about a plane comprising the longitudinal axis of the engine and the yaw axis of modular aircraft 1100.

With continued reference to FIG. 11, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 11, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 11, in nonlimiting embodiments, at least a flight component 1108 may include an airbreathing engine such as a jet engine, turbojet engine, turboshaft engine, ramjet engine, scramjet engine, hybrid propulsion system, turbofan engine, or the like. At least a flight component 1108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 11, an aircraft 1100 may include a flight controller. As used in this disclosure, a "flight controller" is a device that generates signals for controlling at least a flight component 1108 of an aircraft 1100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 11, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 1100 and/or computing device.

With continued reference to FIG. 11, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
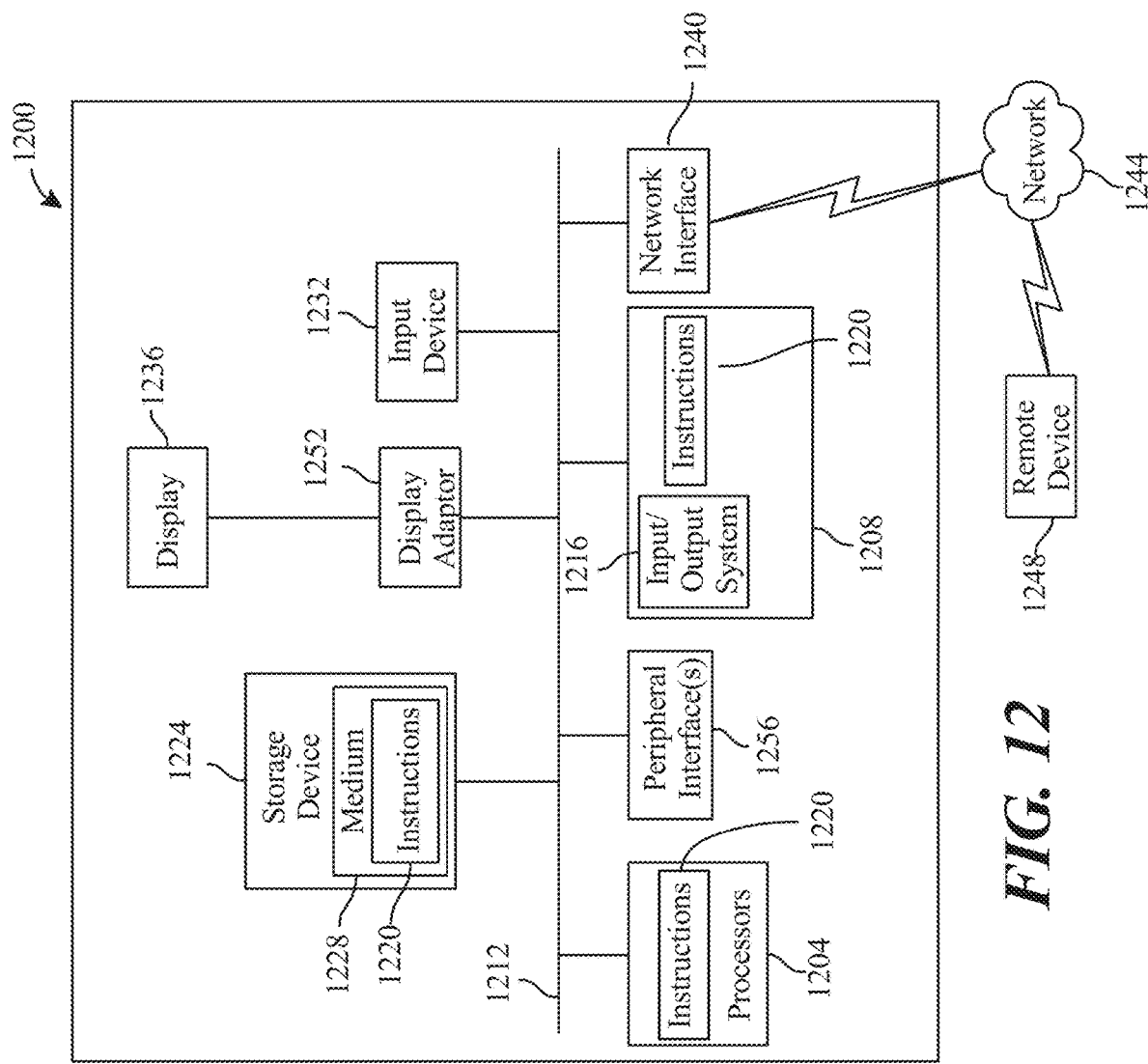
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body (BWB) aircraft with coupled landing gear apparatus, comprising:
 a fixed-wing aircraft body having no demarcation between wings and a main body of the BWB aircraft at a leading edge of the wings;
 at least a nose gear disposed forward of a neutral point of the BWB aircraft by a first distance, wherein the at least a nose gear comprises at least a nose hydraulic cylinder; and
 at least a main gear disposed aft of the neutral point of the BWB aircraft by a second distance, wherein the at least a main gear comprises at least a main hydraulic cylinder;
 wherein the at least a nose gear and the at least a main gear are hydraulically linked in hydraulic communication with one another, such that when the main hydraulic cylinder collapses the nose hydraulic cylinder extends while the coupled landing gear is on the ground during takeoff of the BWB aircraft, causing the front of the BWB aircraft to be raised and the rear of the BWB aircraft to be lowered and wherein:
 the main hydraulic cylinder and the nose hydraulic cylinder are locked in a level position below a predetermined speed; and
 the main hydraulic cylinder comprises a larger total piston surface area than a total piston surface area of the nose hydraulic cylinder, wherein the distance from the nose gear to a center of gravity of the fixed-wing aircraft body is larger than a distance of the main gear to the center of gravity of the fixed-wing aircraft body to produce hydro-mechanical equilibrium.

2. The BWB aircraft of claim 1, wherein an extension of the nose hydraulic cylinder of the at least a nose gear, with respect to the BWB aircraft, increases an angle of attack of the BWB aircraft during take-off.

3. The BWB aircraft of claim 1, wherein a communication between the at least a nose gear and the at least a main gear comprises an electromechanical communication.

4. The BWB aircraft of claim 1, wherein the at least a nose gear and the at least a main gear are in communication through a longitudinal member.

5. The BWB aircraft of claim 1, further comprising a controller configured to control an actuator connected to the at least a nose gear and control the at least a main gear to vary the angle of attack of the BWB aircraft.

6. The BWB aircraft of claim 1, wherein the at least a nose gear and the at least a main gear are arranged in a tricycle arrangement.

7. The BWB aircraft of claim 1, wherein the at least a nose gear and the at least a main gear are configured to move in opposition.

8. A method of using a coupled landing gear for a blended wing body (BWB) aircraft, the method comprising:
 disposing a fixed-wing aircraft body having no clear demarcation between wings and a main body of the BWB aircraft at a leading edge of the wings;
 disposing at least a nose gear forward of neutral point of the aircraft by a first distance, wherein the at least a nose gear comprises at least a nose hydraulic cylinder;
 disposing at least a main gear aft of the neutral point of the BWB aircraft by a second distance, wherein the at least a main gear comprises at least a main hydraulic cylinder, and
 wherein the at least a nose gear and the at least a main gear are hydraulically linked in hydraulic communication with one another, such that when the main hydraulic cylinder collapses the nose hydraulic cylinder extends while the coupled landing gear is on the ground during takeoff of the BWB aircraft, causing the front of the BWB aircraft to be raised and the rear of the BWB aircraft to be lowered and wherein:
 the main hydraulic cylinder and nose hydraulic cylinder are locked in a level position below a predetermined speed; and
 the main hydraulic cylinder comprises a larger total piston surface area than a total piston surface area of the nose hydraulic cylinder, wherein the distance from the nose gear to a center of gravity of the fixed-wing aircraft body is larger than a distance of the main gear to the center of gravity of the fixed-wing aircraft body to produce hydro-mechanical equilibrium.

9. The method of claim 8, wherein an extension of the nose hydraulic cylinder of the at least a nose gear, with respect to the BWB aircraft, increases an angle of attack of the BWB aircraft during take-off.

10. The method of claim 8, wherein a communication between the at least a nose gear and the at least a main gear comprises an electromechanical communication.

11. The method of claim 8, wherein the at least a nose gear and the at least a main gear are in communication through a longitudinal member.

12. The method of claim 8, further comprising controlling, by a controller, an actuator connected to the at least a nose gear and the at least a main gear to vary an angle of attack of the BWB aircraft.

13. The method of claim 8, wherein the at least a nose gear and the at least a main gear are arranged in a tricycle arrangement.

14. The method of claim 8, wherein the at least a nose gear and the at least a main gear are configured to move in opposition.

* * * * *